United States Patent
Lin et al.

(10) Patent No.: US 12,531,704 B2
(45) Date of Patent: Jan. 20, 2026

(54) TERMINAL DEVICES AND BASE STATION DEVICES

(71) Applicant: SHARP KABUSHIKI KAISHA, Sakai (JP)

(72) Inventors: Huifa Lin, Sakai (JP); Shoichi Suzuki, Sakai (JP); Daiichiro Nakashima, Sakai (JP); Toshizo Nogami, Sakai (JP); Wataru Ouchi, Sakai (JP); Takahisa Fukui, Sakai (JP); Ryota Morimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 397 days.

(21) Appl. No.: 18/111,489

(22) Filed: Feb. 17, 2023

(65) Prior Publication Data
US 2023/0291528 A1    Sep. 14, 2023

(30) Foreign Application Priority Data
Mar. 9, 2022   (JP) ................... 2022-035926

(51) Int. Cl.
G06N 3/09    (2023.01)
G06N 20/00   (2019.01)
H04L 5/00    (2006.01)

(52) U.S. Cl.
CPC .................. *H04L 5/0057* (2013.01)

(58) Field of Classification Search
CPC .............. H04L 5/0057; H04L 1/1671; H04L 1/1854; H04L 1/0026; H04L 1/0029; G06N 3/09; G06N 3/0455; G06N 20/00
USPC ......................................... 370/329
See application file for complete search history.

(56) References Cited

U.S. PATENT DOCUMENTS

| | | | |
|---|---|---|---|
| 2023/0262448 A1* | 8/2023 | Rydén | G06N 20/00 455/418 |
| 2024/0275519 A1* | 8/2024 | Timo | H04B 7/0658 |
| 2024/0283509 A1* | 8/2024 | Timo | G06N 3/096 |
| 2025/0030612 A1* | 1/2025 | Guan | H04W 24/02 |
| 2025/0047346 A1* | 2/2025 | Timo | H04L 5/0057 |

* cited by examiner

*Primary Examiner* — Christopher M Crutchfield
*Assistant Examiner* — Syed Ahmed
(74) *Attorney, Agent, or Firm* — ScienBiziP, P.C.

(57) ABSTRACT

A terminal device receives a reference signal, a first machine learning model, and a second machine learning method, and transmits a CSI report. The terminal device selects a machine learning model that is used to compress a CSI related data obtained from the reference signal. The terminal device includes the compressed CSI data and an indication indicating the selected machine learning model in the CSI report.

2 Claims, 14 Drawing Sheets

Figure 2A: Number of OFDM symbols per slot, slots per frame, and slots per subframe for normal cyclic prefix

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |
| 6 | 14 | 640 | 64 |

Figure 2B: Number of OFDM symbols per slot, slots per frame, and slots per subframe for extended cyclic prefix

| u | $N^{slot}_{symb}$ | $N^{frame,u}_{slot}$ | $N^{subframe,u}_{slot}$ |
|---|---|---|---|
| 2 | 12 | 40 | 4 |

Figure 2

TERMINAL DEVICES AND BASE STATION DEVICES

TECHNICAL FIELD

The present disclosure relates to terminal devices and base station devices.

Priority is claimed on Japanese Patent Application No. 2022-035926, filed Mar. 9, 2022, the content of which is incorporated herein by reference.

BACKGROUND

In the 3rd Generation Partnership Project (3GPP), a radio access method and a radio network for cellular mobile communications (hereinafter, referred to as Long Term Evolution, or Evolved Universal Terrestrial Radio Access) have been studied. In LTE (Long Term Evolution), a base station device is also referred to as an evolved NodeB (eNodeB), and a terminal device is also referred to as a User Equipment (UE). LTE is a cellular communication system in which multiple areas are deployed in a cellular structure, with each of the multiple areas being covered by a base station device. A single base station device may manage multiple cells. Evolved Universal Terrestrial Radio Access is also referred as E-UTRA.

In the 3GPP, the next generation standard (New Radio: NR) has been studied in order to make a proposal to the International-Mobile-Telecommunication-2020 (IMT-2020) which is a standard for the next generation mobile communication system defined by the International Telecommunications Union (ITU). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework. In NR, a base station device is also referred to as a gNodeB, and a terminal device is also referred to as a User Equipment (UE).

Wireless communication devices may communicate with one or more devices using a communication structure. However, the communication structure may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 is an example showing the relationship between subcarrier-spacing configuration u, a number of OFDM symbols per slot $N^{slot}_{symb}$, and the CP configuration according to an aspect of the present embodiment;

DETAILED DESCRIPTION

A function of floor (CX) may be a floor function for real number CX. For example, floor (CX) may be a function that provides the largest integer within a range that does not exceed the real number CX. A function of ceil (DX) may be a ceiling function to a real number DX. For example, ceil (DX) may be a function that provides the smallest integer within the range not less than the real number DX. A function of mod (EX, FX) may be a function that provides the remainder obtained by dividing EX by FX. A function of mod (EX, FX) may be a function that provides a value which corresponds to the remainder of dividing EX by FX. A function of exp (GX) may be an exponential function that may be expressed as $e^{\hat{}}GX$, where e is the Napier number. $(HX)\hat{}(IX)$ indicates IX to the power of HX. A function of $\log_B$ (JX) indicates logarithm of JX to base B. A function of max (KX, LX) indicates the maximum value between KX and LX. A function of min (MX, NX) indicates the minimum value between MX and NX.

In a wireless communication system according to one aspect of the present embodiment, at least OFDM (Orthogonal Frequency Division Multiplex) is used. An OFDM symbol is a time domain unit in the OFDM. The OFDM symbol may include at least one or more subcarriers. That is, the OFDM symbol may correspond to least one or more subcarriers in the frequency domain. An OFDM symbol is converted to a time-continuous signal in baseband signal generation. In downlink, at least CP-OFDM (Cyclic Prefix-Orthogonal Frequency Division Multiplex) is used. In uplink, either the CP-OFDM or the DFT-s-OFDM (Discrete Fourier Transform-spread-Orthogonal Frequency Division Multiplex) is used. The DFT-s-OFDM may be implemented by applying transform precoding to the CP-OFDM. The CP-OFDM is the OFDM using CP (Cyclic Prefix).

An OFDM symbol may be a designation including a CP added to the OFDM symbol. That is, an OFDM symbol may be configured to include the OFDM symbol and a CP added to the OFDM symbol. An OFDM symbol may be a designation not including a CP added to the OFDM symbol.

Figure 1:
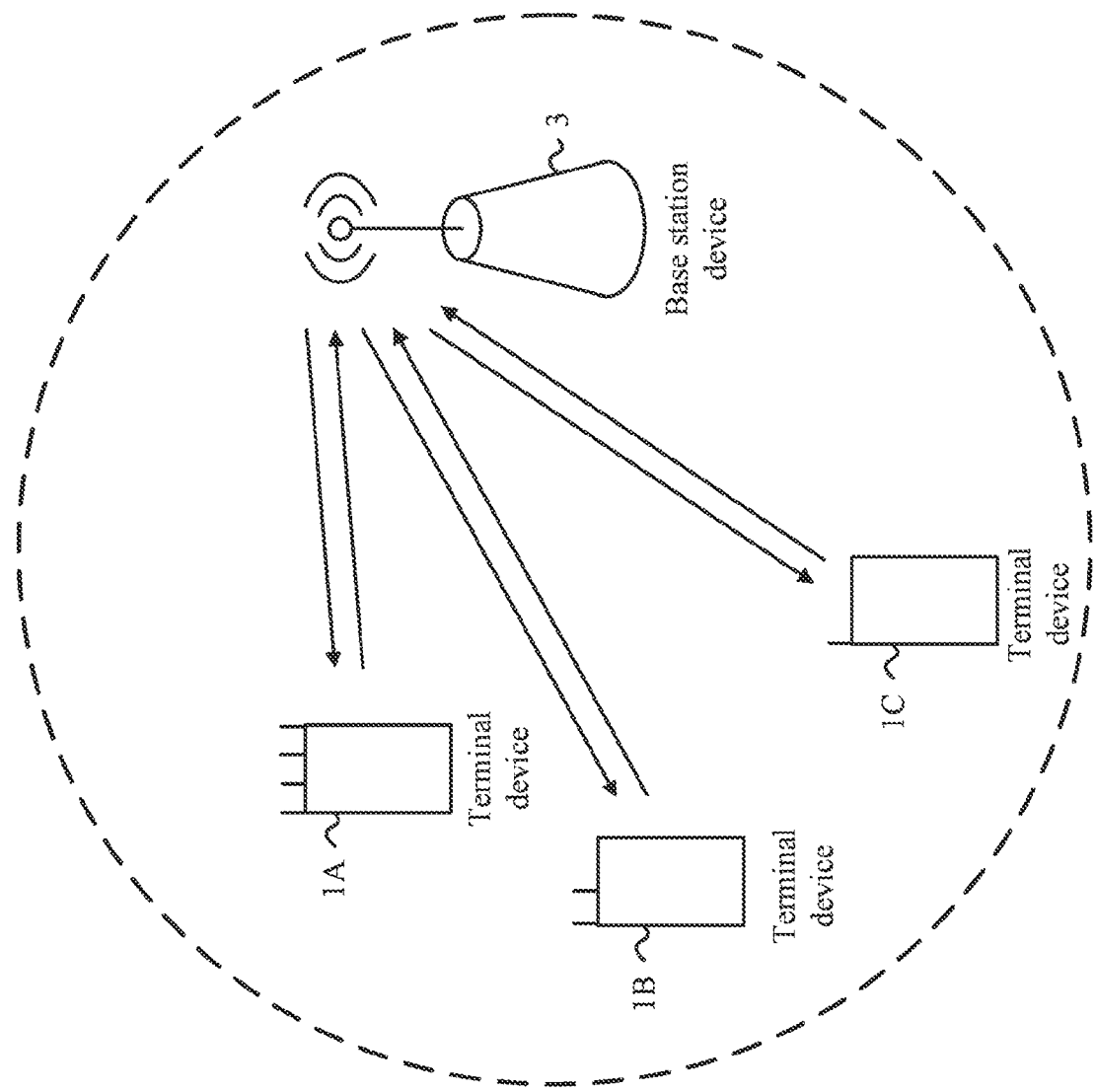
FIG. 1 is a conceptual diagram of a wireless communication system according to an aspect of the present embodiment.

FIG. 1 is a conceptual diagram of a wireless communication system according to an aspect of the present embodiment. In FIG. 1, the wireless communication system includes at least terminal device 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices (or transmission points, transmission devices, reception devices, transmission points, reception points). When the base station device 3 is configured by a plurality of transmission devices, the plurality of transmission devices may be arranged at different locations or at the same location.

The base station device 3 may provide/have/consist of one or more serving cells. A serving cell may be defined as a set of resources used for wireless communication. A serving cell is also referred to as a cell.

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers). A component carrier (carrier) may provide/have/consist of a set of resources in frequency domain.

For example, one resource grid may be provided for one component carrier. For example, one resource grid may be provided for one component carrier and a subcarrier-spacing configuration u. The subcarrier-spacing configuration u is also referred to as numerology. A resource grid includes $N^{size,u}_{grid,x} N^{RB}_{sc}$ subcarriers. The resource grid starts from a common resource block with index $N^{start,u}_{grid}$. The common resource block with the index $N^{start,u}_{grid}$ is also referred to as a reference point of the resource grid. The resource grid includes $N^{subframe,u}_{symb}$ OFDM symbols. The subscript x indicates the transmission direction that may be either downlink or uplink. One resource grid is provided for an antenna port p, a subcarrier-spacing configuration u, and a transmission direction x.

$N^{size,u}_{grid,x}$ and $N^{start,u}_{grid}$ are given based at least on a higher-layer parameter (e.g. referred to as higher-layer parameter CarrierBandwidth). The higher-layer parameter is used to define one or more SCS (SubCarrier-Spacing) specific carriers. One resource grid corresponds to one SCS specific carrier. One component carrier may comprise one or more SCS specific carriers. The SCS specific carrier may be included in a system information block (SIB). For each SCS specific carrier, a subcarrier-spacing configuration u may be provided.

FIG. 2 is an example showing the relationship between subcarrier-spacing configuration u, a number of OFDM symbols per slot $N^{slot}_{symb}$, and the CP configuration according to an aspect of the present embodiment. In FIG. 2A, for example, when the subcarrier-spacing configuration u is set to 2 and the CP configuration is set to normal CP (normal cyclic prefix), $N^{slot}_{symb}=14$, $N^{frame,u}_{slot}=40$, and $N^{subframe,u}_{slot}=4$. In FIG. 2B, for example, when the subcarrier-spacing configuration u is set to 2 and the CP configuration is set to an extended CP (extended cyclic prefix), $N^{slot}_{symb}=12$, $N^{frame,u}_{slot}=40$, and $N^{subframe,u}_{slot}=4$.

In the wireless communication system according to an aspect of the present embodiment, a time unit $T_c$ may be used to represent the length of the time domain. The time unit $T_c$ is given by $T_c=1/(df_{max}*N_f)$, where $df_{max}=480$ kHz and $N_f=4096$. The constant k is given by $k=df_{max}*N_f/(df_{ref}N_{f,ref})=64$, where $df_{ref}=15$ kHz and $N_{f,ref}=2048$.

Transmission of signals in the downlink and/or transmission of signals in the uplink may be organized into radio frames (system frames, frames) of length $T_f$, where $T_f=(df_{max}N_f/100)*T_c=10$ ms. One radio frame includes ten subframes. The subframe length is $T_{sf}=(df_{max}N_f/1000)T_c=1$ ms. A subframe includes $N^{subframe,u}_{slot}=N^{slot}_{symb}$ $N^{subframe,u}_{slot}$ OFDM symbols.

For a subcarrier-spacing configuration u, a number of slots included in a subframe and indexes may be given. For example, slot index $n^u_s$ may be given in ascending order with an integer value ranging from 0 to $N^{subframe,u}_{slot}-1$ in a subframe. For subcarrier-spacing configuration u, a number of slots included in a radio frame and indexes of slots included in the radio frame may be given. Also, the slot index $n^u_{s,t}$ may be given in ascending order with an integer value ranging from 0 to $N^{frame,u}_{slot}-1$ in the radio frame. Consecutive $N^{slot}_{symb}$ OFDM symbols may be included in one slot. It is $N^{slot}_{symb}=14$.

Figure 3:
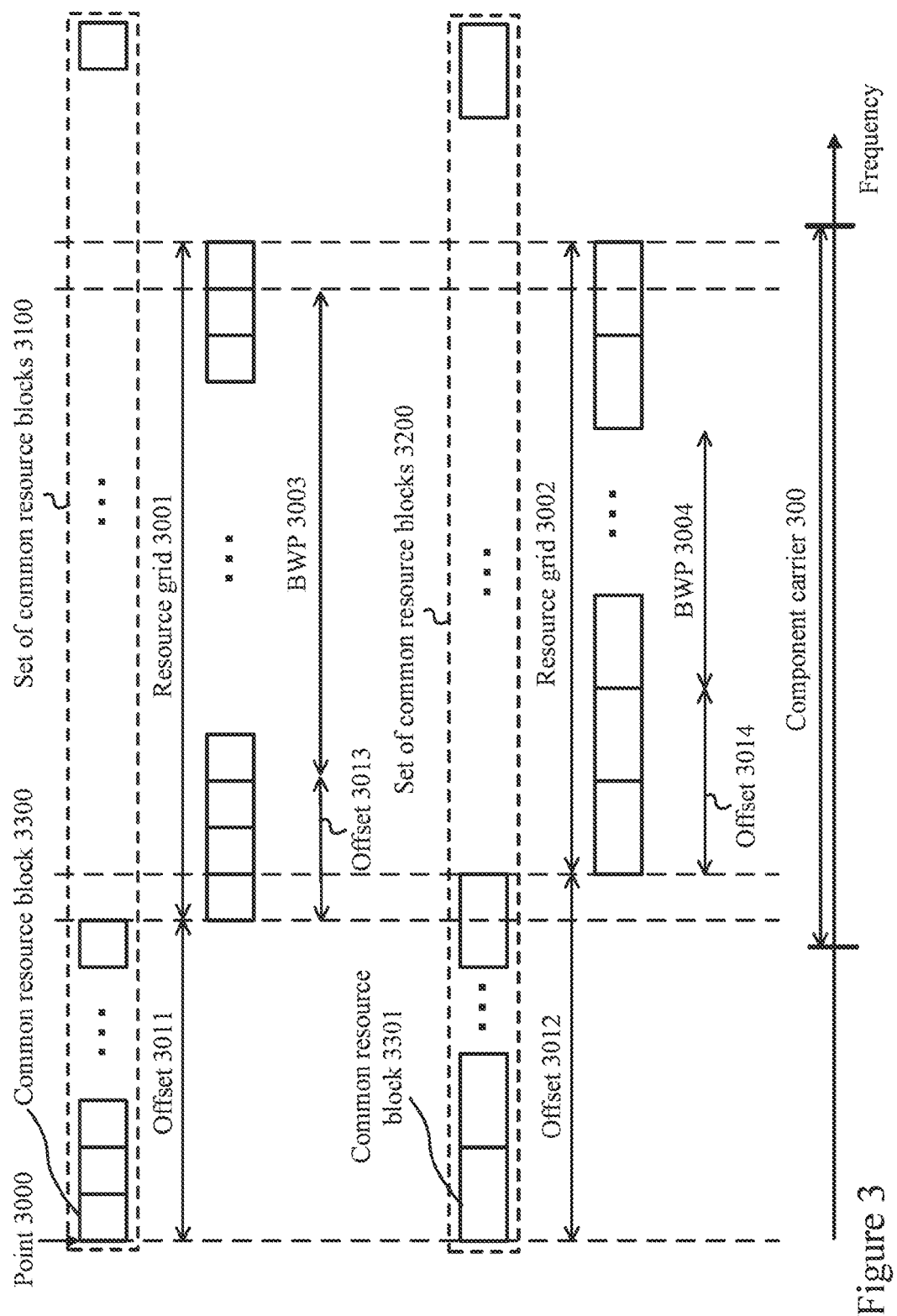
FIG. 3 is a diagram showing an example of a method of configuring a resource grid according to an aspect of the present embodiment.

FIG. 3 is a diagram showing an example of a method of configuring a resource grid according to an aspect of the present embodiment. The horizontal axis in FIG. 3 indicates frequency domain. FIG. 3 shows a configuration example of a resource grid of subcarrier-spacing configuration $u=u_1$ in the component carrier 300 and a configuration example of a resource grid of subcarrier-spacing configuration $u=u_2$ in a component carrier. One or more subcarrier-spacing configuration may be set for a component carrier. Although it is assumed in FIG. 3 that $u_1=u_2-1$, various aspects of this embodiment are not limited to the condition of $u_1=u_2-1$.

The component carrier 300 is a band having a predetermined width in the frequency domain.

Point 3000 is an identifier for identifying a subcarrier. Point 3000 is also referred to as point A. The common resource block (CRB: Common resource block) set 3100 is a set of common resource blocks for the subcarrier-spacing configuration $u_1$.

Among the common resource block-set 3100, common resource block 3300 including the point 3000 is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by a number of common resource blocks which is relative to the subcarrier-spacing configuration $u_1$. The resource grid 3001 includes $N^{size,u}_{grid1,x}$ common resource blocks starting from the reference point of the resource grid 3001.

The offset 3013 is an offset from the reference point of the resource grid 3001 to the reference point ($N^{start,u}_{BWP,i1}$) of the BWP (BandWidth Part) 3003 of the index i1.

Common resource block-set 3200 is a set of common resource blocks with respect to subcarrier-spacing configuration $u_2$.

Common resource block 3301 in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by a number of common resource blocks for subcarrier-spacing configuration $u=u_2$. The resource grid 3002 includes $N^{size,u}_{grid2,x}$ common resource blocks starting from the reference point of the resource grid 3002.

The offset 3014 is an offset from the reference point of the resource grid 3002 to the reference point ($N^{start,u}_{BWP,i2}$) of the BWP 3004 with index $i_2$.

Figure 4:
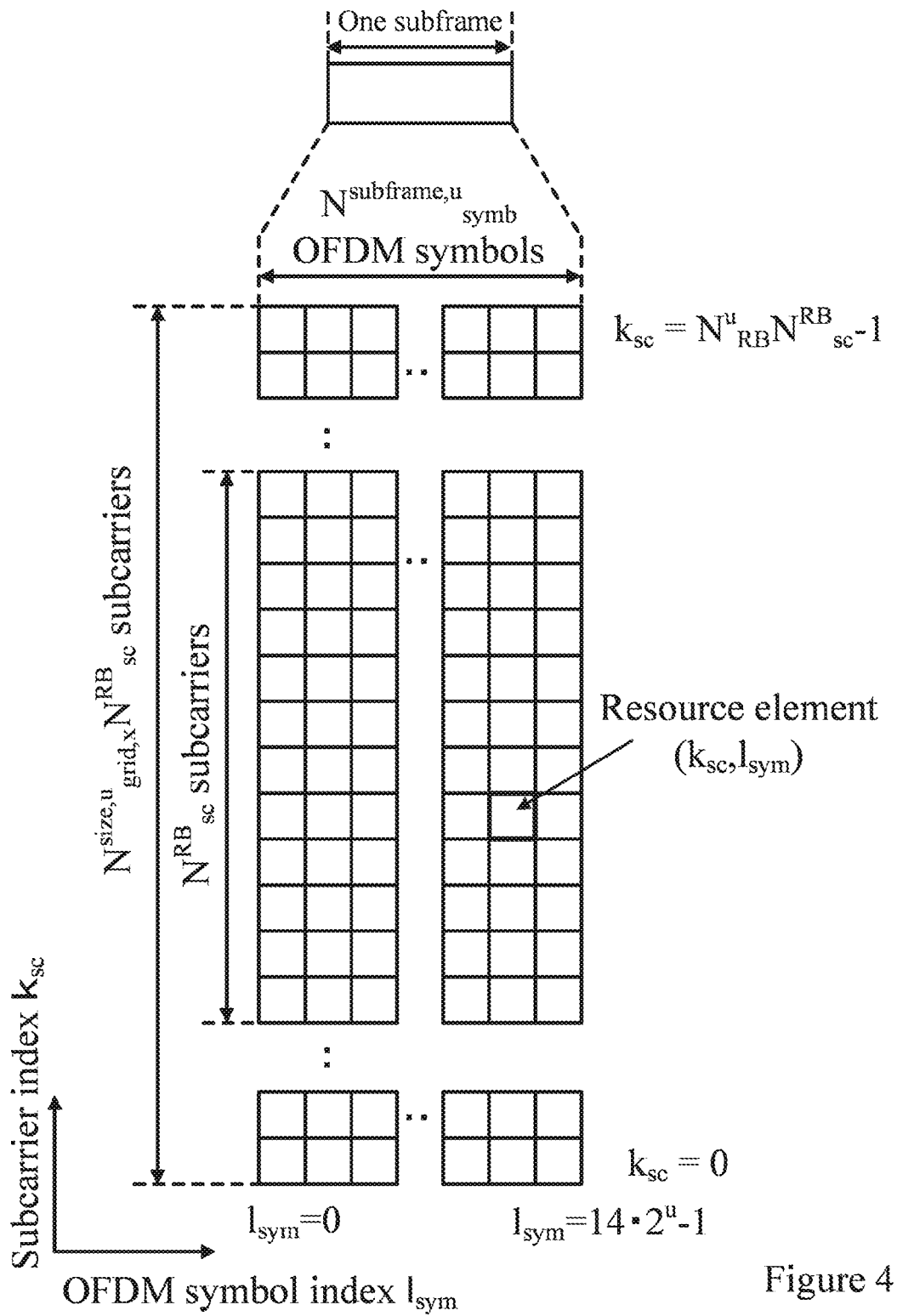
FIG. 4 is a diagram showing a configuration example of a resource grid 3001 according to an aspect of the present embodiment.

FIG. 4 is a diagram showing a configuration example of a resource grid 3001 according to an aspect of the present embodiment. In the resource grid of FIG. 4, the horizontal axis indicates OFDM symbol index $l_{sym}$, and the vertical axis indicates the subcarrier index $k_{sc}$. The resource grid 3001 includes $N^{size,u}_{grid1} \times N^{RB}_{sc}$ subcarriers, and includes $N^{subframe,u}_{symb}$ OFDM symbols. A resource specified by the subcarrier index $k_{sc}$ and the OFDM symbol index $l_{sym}$ in a resource grid is also referred to as a resource element (RE: Resource Element).

A resource block (RB: Resource Block) includes $N^{RB}_{sc}$ consecutive subcarriers. A resource block is a generic name of a common resource block, a physical resource block (PRB: Physical Resource Block), and a virtual resource block (VRB: Virtual Resource Block). $N^{RB}_{sc}$ may be 12.

A resource block unit is a set of resources that corresponds to one OFDM symbol in one resource block. That is, one resource block unit includes 12 resource elements which corresponds to one OFDM symbol in one resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}$=ceil ($k_c/N^{RB}_{sc}$). The subcarrier with $k_{sc}$=0 is a subcarrier with the same center frequency as the center frequency of the subcarrier which corresponds to the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

A BWP is defined as a subset of common resource blocks included in the resource grid. The BWP includes $N^{size,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Figure 5:
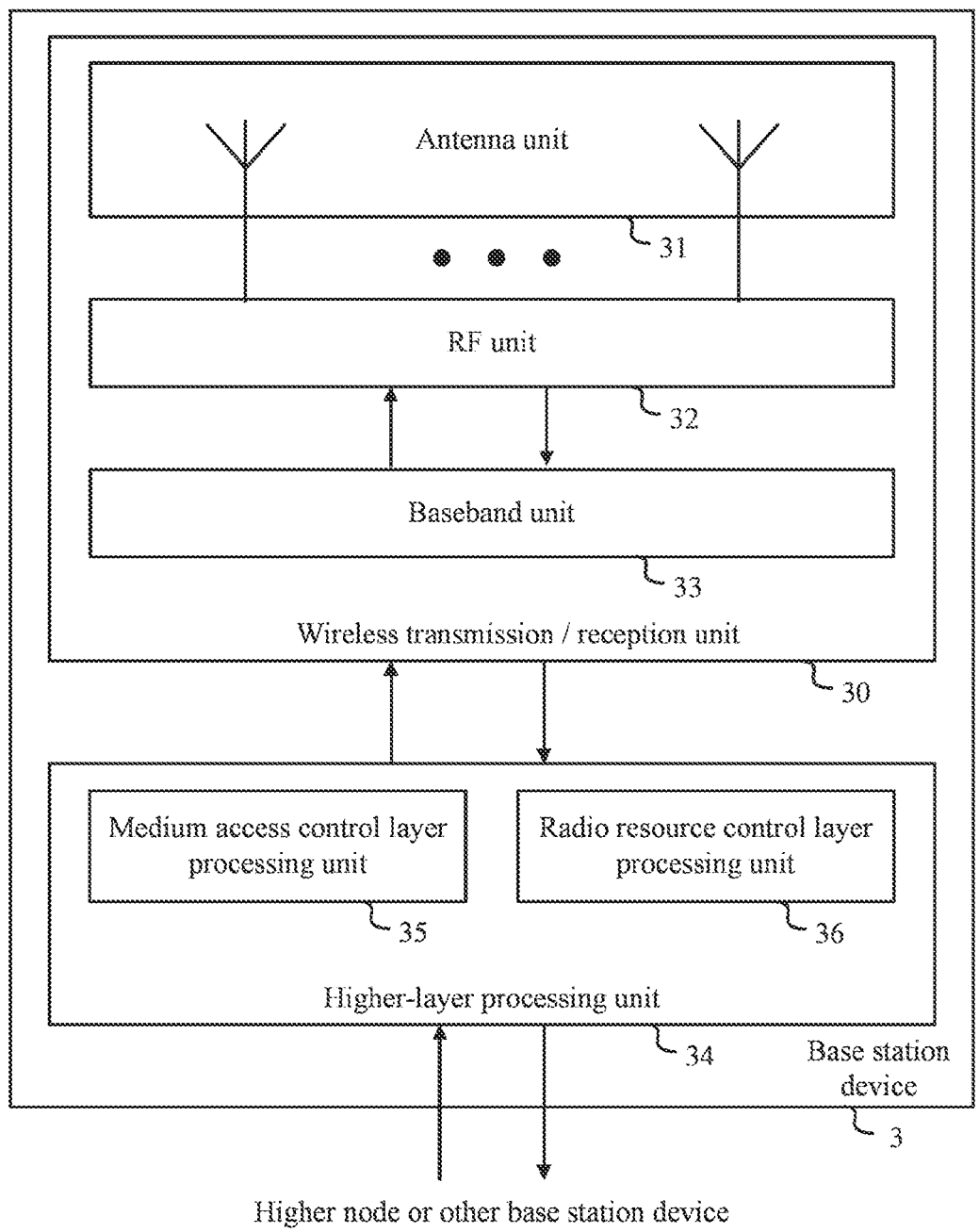
FIG. 5 is a schematic block diagram showing a configuration example of the base station device 3 according to an aspect of the present embodiment.

FIG. 5 is a schematic block diagram showing a configuration example of the base station device 3 according to an aspect of the present embodiment. As shown in FIG. 5, the base station device 3 includes at least a part of or all the wireless transmission/reception unit (physical layer processing unit) 30 and the higher-layer processing unit 34. The wireless transmission/reception unit 30 includes at least a part of or all the antenna unit 31, the RF unit 32 (Radio Frequency unit 32), and the baseband unit 33. The higher-layer processing unit 34 includes at least a part of or all the medium access control layer processing unit 35 and the radio resource control (RRC: Radio Resource Control) layer processing unit 36.

The wireless transmission/reception unit 30 includes at least a part of or all a wireless transmission unit 30a and a wireless reception unit 30b. The configuration of the baseband unit 33 included in the wireless transmission unit 30a and the configuration of the baseband unit 33 included in the wireless reception unit 30b may be the same or different. The configuration of the RF unit 32 included in the wireless transmission unit 30a and the configuration of the RF unit 32 included in the wireless reception unit 30b may be the same or different. The configuration of the antenna unit 31 included in the wireless transmission unit 30a and the configuration of the antenna unit 31 included in the wireless reception unit 30b may be the same or different.

The higher-layer processing unit 34 provides downlink data (a transport block) to the wireless transmission/reception unit 30 (or the wireless transmission unit 30a). The higher-layer processing unit 34 performs processing of a medium access control (MAC) layer, a packet data convergence protocol layer (PDCP layer), a radio link control layer (RLC layer) and/or an RRC layer.

The medium access control layer processing unit 35 included in the higher-layer processing unit 34 performs processing of the MAC layer.

The radio resource control layer processing unit 36 included in the higher-layer processing unit 34 performs the process of the RRC layer. The radio resource control layer processing unit 36 manages various configuration information/parameters (RRC parameters) of the terminal device 1. The radio resource control layer processing unit 36 configures an RRC parameter based on the RRC message received from the terminal device 1.

The wireless transmission/reception unit 30 (or the wireless transmission unit 30a) performs processing such as encoding and modulation. The wireless transmission/reception unit 30 (or the wireless transmission unit 30a) generates a physical signal by encoding and modulating the downlink data. The wireless transmission/reception unit 30 (or the wireless transmission unit 30a) converts OFDM symbols in the physical signal to a baseband signal by conversion to a time-continuous signal. The wireless transmission/reception unit 30 (or the wireless transmission unit 30a) transmits the baseband signal (or the physical signal) to the terminal device 1 via radio frequency. The wireless transmission/reception unit 30 (or the wireless transmission unit 30a) may arrange the baseband signal (or the physical signal) on a component carrier and transmit the baseband signal (or the physical signal) to the terminal device 1.

The wireless transmission/reception unit 30 (or the wireless reception unit 30b) performs processing such as demodulation and decoding. The wireless transmission/reception unit 30 (or the wireless reception unit 30b) separates, demodulates and decodes the received physical signal, and provides the decoded information to the higher-layer processing unit 34. The wireless transmission/reception unit 30 (or the wireless reception unit 30b) may perform the channel access procedure prior to the transmission of the physical signal.

The RF unit 32 demodulates the physical signal received via the antenna unit 31 into a baseband signal (down convert), and/or removes extra frequency components. The RF unit 32 provides the processed analog signal to the baseband unit 33.

The baseband unit 33 converts an analog signal (signals on radio frequency) input from the RF unit 32 into a digital signal (a baseband signal). The baseband unit 33 separates a portion which corresponds to CP (Cyclic Prefix) from the digital signal. The baseband unit 33 performs Fast Fourier Transformation (FFT) on the digital signal from which the CP has been removed. The baseband unit 33 provides the physical signal in the frequency domain.

The baseband unit 33 performs Inverse Fast Fourier Transformation (IFFT) on downlink data to generate an OFDM symbol, adds a CP to the generated OFDM symbol, generates a digital signal (baseband signal), and convert the digital signal into an analog signal. The baseband unit 33 provides the analog signal to the RF unit 32.

The RF unit 32 removes extra frequency components from the analog signal (signals on radio frequency) input from the baseband unit 33, up-converts the analog signal to a radio frequency and transmits it via the antenna unit 31. The RF unit 32 may have a function of transmission power controlling. The RF unit 32 may be also referred to as a transmission power control unit.

At least one or more serving cells (or one or more component carriers, one or more downlink component carriers, one or more uplink component carriers) may be configured for the terminal device 1.

Each of the serving cells set for the terminal device 1 may be any of PCell (Primary cell), PSCell (Primary SCG cell), and SCell (Secondary Cell).

A PCell is a serving cell included in a MCG (Master Cell Group). A PCell is a cell (implemented cell) on which the terminal device 1 performs an initial connection establishment procedure or a connection re-establishment procedure.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells (or one or more component carriers). One or more serving cells (or one or more component carriers) included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The terminal device 1 may receive the PDSCH, the PDCCH, and the CSI-RS in the active downlink BWP. A PUCCH and a PUSCH may be sent on the active uplink BWP. The terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The terminal device 1 may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The terminal device 1 may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs which are other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any inactive uplink BWP which is other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Figure 6:
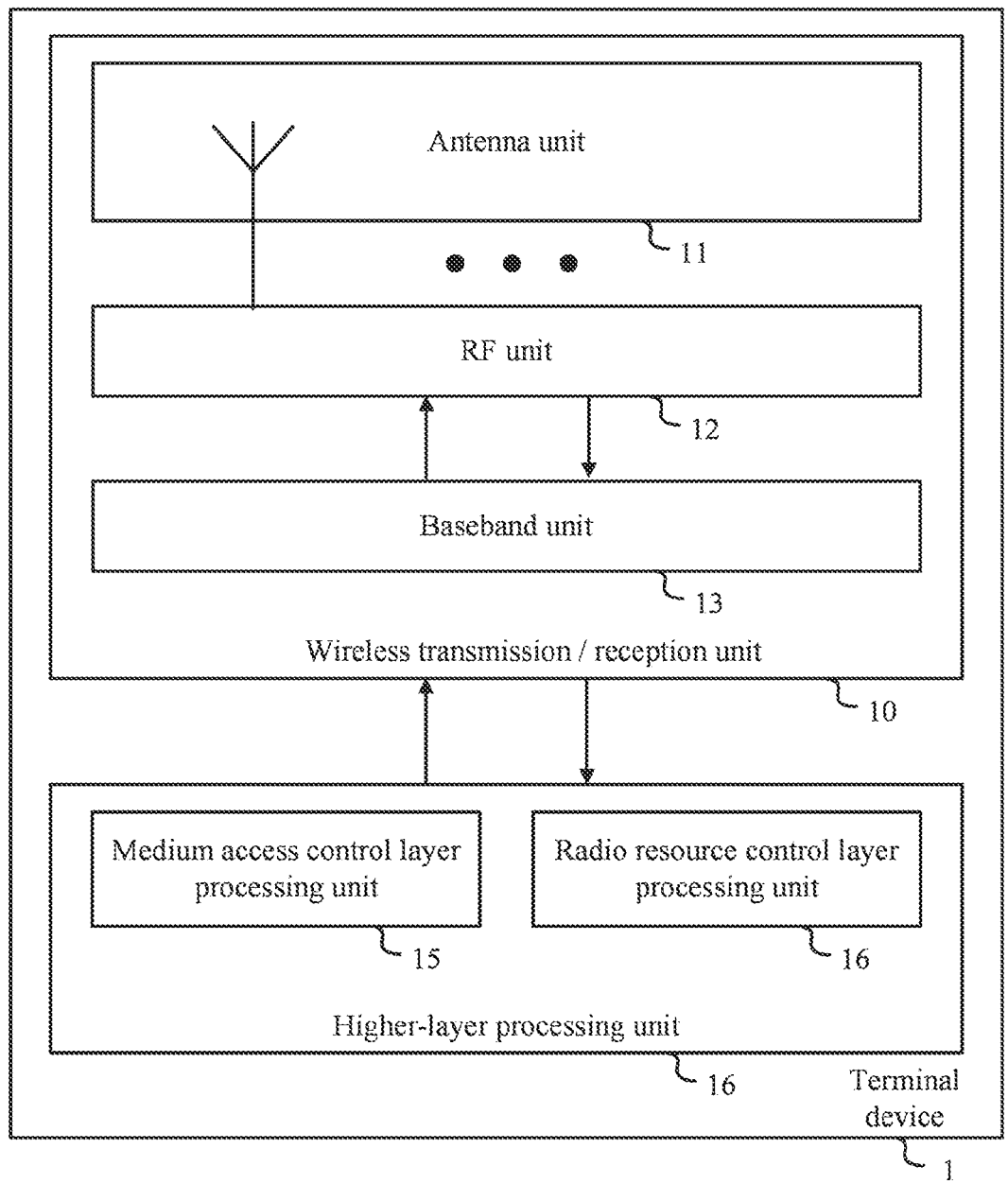
FIG. 6 is a schematic block diagram showing a configuration example of the terminal device 1 according to an aspect of the present embodiment.

FIG. 6 is a schematic block diagram showing a configuration example of the terminal device 1 according to an aspect of the present embodiment. As shown in FIG. 6, the terminal device 1 includes at least a part of or all the wireless transmission/reception unit (physical layer processing unit) 10 and the higher-layer processing unit 14. The wireless transmission/reception unit 10 includes at least a part of or all the antenna unit 11, the RF unit 12, and the baseband unit 13. The higher-layer processing unit 14 includes at least a part of or all the medium access control layer processing unit 15 and the radio resource control layer processing unit 16.

The wireless transmission/reception unit 10 includes at least a part of or all a wireless transmission unit 10a and a wireless reception unit 10b. The configuration of the baseband unit 13 included in the wireless transmission unit 10a and the configuration of the baseband unit 13 included in the wireless reception unit 10b may be the same or different. The configuration of the RF unit 12 included in the wireless transmission unit 10a and the RF unit 12 included in the wireless reception unit 10b may be the same or different. The configuration of the antenna unit 11 included in the wireless transmission unit 10a and the configuration of the antenna unit 11 included in the wireless reception unit 10b may be the same or different.

The higher-layer processing unit 14 provides uplink data (a transport block) to the wireless transmission/reception unit 10 (or the wireless transmission unit 10a). The higher-layer processing unit 14 performs processing of a MAC layer, a packet data integration protocol layer, a radio link control layer, and/or an RRC layer.

The medium access control layer processing unit 15 included in the higher-layer processing unit 14 performs processing of the MAC layer.

The radio resource control layer processing unit 16 included in the higher-layer processing unit 14 performs the process of the RRC layer. The radio resource control layer processing unit 16 manages various configuration information/parameters (RRC parameters) of the terminal device 1. The radio resource control layer processing unit 16 configures RRC parameters based on the RRC message received from the base station device 3.

The wireless transmission/reception unit 10 (or the wireless transmission unit 10a) performs processing such as encoding and modulation. The wireless transmission/reception unit 10 (or the wireless transmission unit 10a) generates a physical signal by encoding and modulating the uplink data. The wireless transmission/reception unit 10 (or the wireless transmission unit 10a) converts OFDM symbols in the physical signal to a baseband signal by conversion to a time-continuous signal. The wireless transmission/reception unit 10 (or the wireless transmission unit 10a) transmits the baseband signal (or the physical signal) to the base station device 3 via radio frequency. The wireless transmission/reception unit 10 (or the wireless transmission unit 10a) may arrange the baseband signal (or the physical signal) on a BWP (active uplink BWP) and transmit the baseband signal (or the physical signal) to the base station device 3.

The wireless transmission/reception unit 10 (or the wireless reception unit 10b) performs processing such as demodulation and decoding. The wireless transmission/reception unit 10 (or the wireless reception unit 10b) may receive a physical signal in a BWP (active downlink BWP) of a serving cell. The wireless transmission/reception unit 10 (or the wireless reception unit 10b) separates, demodulates and decodes the received physical signal, and provides the decoded information to the higher-layer processing unit 14. The wireless transmission/reception unit 10 (or the wireless reception unit 10b) may perform the channel access procedure prior to the transmission of the physical signal.

The RF unit 12 demodulates the physical signal received via the antenna unit 11 into a baseband signal (down convert), and/or removes extra frequency components. The RF unit 12 provides the processed analog signal to the baseband unit 13.

The baseband unit 13 converts an analog signal (signals on radio frequency) input from the RF unit 12 into a digital signal (a baseband signal). The baseband unit 13 separates a portion which corresponds to CP from the digital signal, performs fast Fourier transformation on the digital signal from which the CP has been removed, and provides the physical signal in the frequency domain.

The baseband unit 13 performs inverse fast Fourier transformation on uplink data to generate an OFDM symbol, adds a CP to the generated OFDM symbol, generates a digital signal (baseband signal), and convert the digital signal into an analog signal. The baseband unit 13 provides the analog signal to the RF unit 12.

The RF unit 12 removes extra frequency components from the analog signal (signals on radio frequency) input from the baseband unit 13, up-converts the analog signal to a radio frequency and transmits it via the antenna unit 11 The RF unit 12 may have a function of controlling transmission power. The RF unit 12 is also referred to as a transmission power control unit.

Hereinafter, physical signals (signals) will be described.

Physical signal is a generic term for downlink physical channels, downlink physical signals, uplink physical signals, and uplink physical channels. The physical channel is a generic term for downlink physical channels and uplink physical channels.

An uplink physical channel may correspond to a set of resource elements that carry information originating from the higher-layer and/or uplink control information. The uplink physical channel may be a physical channel used in an uplink component carrier. The uplink physical channel may be transmitted by the terminal device 1. The uplink physical channel may be received by the base station device 3. In the wireless communication system according to one aspect of the present embodiment, at least part or all of PUCCH (Physical Uplink Control CHannel), PUSCH (Physical Uplink Shared CHannel), and PRACH (Physical Random Access CHannel) may be used.

A PUCCH may be used to transmit uplink control information (UCI: Uplink Control Information). The PUCCH may be sent to deliver (transmission, convey) uplink control information. The uplink control information may be mapped to (or arranged in) the PUCCH. The terminal device 1 may transmit PUCCH in which uplink control information is arranged. The base station device 3 may receive the PUCCH in which the uplink control information is arranged.

Uplink control information (uplink control information bit, uplink control information sequence, uplink control information type) includes at least part or all of channel state information (CSI: Channel State Information), scheduling request (SR: Scheduling Request), and HARQ-ACK (Hybrid Automatic Repeat request ACKnowledgement).

Channel state information is conveyed by using channel state information bits or a channel state information sequence. Scheduling request is also referred to as a scheduling request bit or a scheduling request sequence. HARQ-ACK information is also referred to as a HARQ-ACK information bit or a HARQ-ACK information sequence.

HARQ-ACK information may include HARQ-ACK status which corresponds to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status may indicate ACK (acknowledgement) or NACK (negative-acknowledgement) corresponding to the transport block. The ACK may indicate that the transport block has been successfully decoded. The NACK may indicate that the transport block has not been successfully decoded. The HARQ-ACK information may include a HARQ-ACK codebook that includes one or more HARQ-ACK status (or HARQ-ACK bits).

For example, the correspondence between the HARQ-ACK information and the transport block may mean that the HARQ-ACK information and the PDSCH used for transmission of the transport block correspond.

HARQ-ACK status may indicate ACK or NACK which correspond to one CBG (Code Block Group) included in the transport block.

The scheduling request may at least be used to request PUSCH (or UL-SCH) resources for new transmission. The scheduling request may be used to indicate either a positive SR or a negative SR. The fact that the scheduling request indicates a positive SR is also referred to as "a positive SR is sent". The positive SR may indicate that the PUSCH (or UL-SCH) resource for initial transmission is requested by the terminal device 1. A positive SR may indicate that a higher-layer is to trigger a scheduling request. The positive SR may be sent when the higher-layer instructs to send a scheduling request. The fact that the scheduling request bit indicates a negative SR is also referred to as "a negative SR is sent". A negative SR may indicate that the PUSCH (or UL-SCH) resource for initial transmission is not requested by the terminal device 1. A negative SR may indicate that the higher-layer does not trigger a scheduling request. A negative SR may be sent if the higher-layer is not instructed to send a scheduling request.

The channel state information may include at least part of or all a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information (CSI) may be provided at least based on receiving one or more physical signals (e.g., one or more CSI-RSs) used at least for channel measurement. A CSI reference signal (CSI-RS) is a type of reference signal that may be used for CSI reporting. The channel state information may be selected by the terminal device 1 at least based on receiving one or more physical signals used for channel measurements. Channel measurements may include interference measurements. Research allocation for a CSI-RS is configured by a higher-layer parameter. For a non-zero-power (NZP) CSI-RS configured by a higher-layer parameter NZP-CSI-RS-Resource or by CSI-RS-Resource-Mobility, a generated sequence for the non-zero-power CSI-RS is mapped to allocated resource elements. The generated sequence is generated at least based on a higher-layer parameter scramblingID or sequenceGenerationConfig. For a zero-power (ZP) CSI-RS configured by a higher-layer parameter ZP-CSI-RS-Resource, the terminal device 1 assumes that the resource elements corresponding to the zero-power CSI-RS are not used for PDSCH transmission.

A PUCCH may correspond to a PUCCH format. A PUCCH may be a set of resource elements used to convey a PUCCH format. A PUCCH may include a PUCCH format. A PUCCH format may include UCI.

A PUSCH may be used to transmit uplink data (a transport block) and/or uplink control information. A PUSCH may be used to transmit uplink data (a transport block) corresponding to a UL-SCH and/or uplink control information. A PUSCH may be used to convey uplink data (a transport block) and/or uplink control information. A PUSCH may be used to convey uplink data (a transport block) corresponding to a UL-SCH and/or uplink control information. Uplink data (a transport block) may be arranged in a PUSCH. Uplink data (a transport block) corresponding to UL-SCH may be arranged in a PUSCH. Uplink control information may be arranged to a PUSCH. The terminal device 1 may transmit a PUSCH in which uplink data (a transport block) and/or uplink control information is arranged. The base station device 3 may receive a PUSCH in which uplink data (a transport block) and/or uplink control information is arranged.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. That is, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH may be collectively referred to as a PUSCH. Transmission of the PUSCH may be transmission of the PUSCH and the DMRS for the PUSCH.

A PUSCH may be estimated from a DMRS for the PUSCH. That is, propagation path of the PUSCH may be estimated from the DMRS for the PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided at least by one PUCCH format. The PUCCH and the DMRS for the PUCCH may be collectively referred to as PUCCH. Transmission of the PUCCH may be transmission of the PUCCH and the DMRS for the PUCCH.

A PUCCH may be estimated from a DMRS for the PUCCH. That is, propagation path of the PUCCH may be estimated from the DMRS for the PUCCH.

A downlink physical channel may correspond to a set of resource elements that carry information originating from the higher-layer and/or downlink control information. The downlink physical channel may be a physical channel used in the downlink component carrier. The base station device 3 may transmit the downlink physical channel. The terminal device 1 may receive the downlink physical channel. In the wireless communication system according to one aspect of the present embodiment, at least a part of or all PBCH (Physical Broadcast Channel), PDCCH (Physical Downlink Control Channel), and PDSCH (Physical Downlink Shared Channel) may be used.

The PBCH may be used to transmit a MIB (Master Information Block) and/or physical layer control information. The physical layer control information is a kind of downlink control information. The PBCH may be sent to deliver the MIB and/or the physical layer control information. A BCH may be mapped (or corresponding) to the PBCH. The terminal device 1 may receive the PBCH. The base station device 3 may transmit the PBCH. The physical layer control information is also referred to as a PBCH payload and a PBCH payload related to timing. The MIB may include one or more higher-layer parameters.

Physical layer control information includes 8 bits. The physical layer control information may include at least part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted (a radio frame including a slot in which the PBCH is transmitted). The radio frame information is represented by 4 bits. The radio frame information may be represented by 4 bits of a radio frame indicator. The radio frame indicator may include 10 bits. For example, the radio frame indicator may at least be used to identify a radio frame from index 0 to index 1023.

The half radio frame information is used to indicate whether the PBCH is transmitted in first five subframes or in second five subframes among radio frames in which the PBCH is transmitted. Here, the half radio frame may be configured to include five subframes. The half radio frame may be configured by five subframes of the first half of ten subframes included in the radio frame. The half radio frame may be configured by five subframes in the second half of ten subframes included in the radio frame.

The SS/PBCH block index information is used to indicate an SS/PBCH block index. The SS/PBCH block index information may be represented by 3 bits. The SS/PBCH block index information may consist of 3 bits of an SS/PBCH block index indicator. The SS/PBCH block index indicator may include 6 bits. The SS/PBCH block index indicator may at least be used to identify an SS/PBCH block from index 0 to index 63 (or from index 0 to index 3, from index 0 to index 7, from index 0 to index 9, from index 0 to index 19, etc.).

The subcarrier offset information is used to indicate subcarrier offset. The subcarrier offset information may be used to indicate the difference between the first subcarrier in which the PBCH is arranged and the first subcarrier in which the control resource set with index 0 is arranged.

A PDCCH may be used to transmit downlink control information (DCI). A PDCCH may be transmitted to deliver downlink control information. Downlink control information may be mapped to a PDCCH. The terminal device 1 may receive a PDCCH in which downlink control information is arranged. The base station device 3 may transmit the PDCCH in which the downlink control information is arranged.

Downlink control information may correspond to a DCI format. Downlink control information may be included in a DCI format. Downlink control information may be arranged in each field of a DCI format.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell (or a PUSCH arranged on a cell). The DCI format 0_0 includes at least a part of or all fields 1A to 1E. The 1A is a DCI format identification field (Identifier field for DCI formats). The 1B is a frequency domain resource assignment field (FDRA field). The 1C is a time domain resource assignment field (TDRA field). The 1D is a frequency-hopping flag field. The 1E is an MCS field (Modulation-and-Coding-Scheme field).

The DCI format identification field may indicate whether the DCI format including the DCI format identification field is an uplink DCI format or a downlink DCI format. The DCI format identification field included in the DCI format 0_0 may indicate 0 (or may indicate that the DCI format 0_0 is an uplink DCI format).

The frequency domain resource assignment field included in the DCI format 0_0 may be at least used to indicate the assignment (allocation) of frequency resources for a PUSCH. The frequency domain resource assignment field included in the DCI format 0_0 may be at least used to indicate the assignment (allocation) of frequency resources for a PUSCH scheduled by the DCI format 0_0.

The time domain resource assignment field included in the DCI format 0_0 may be at least used to indicate the assignment of time resources for a PUSCH. The time domain resource assignment field included in the DCI format 0_0 may be at least used to indicate the assignment of time resources for a PUSCH scheduled by the DCI format 0_0.

The frequency-hopping flag field may be at least used to indicate whether frequency-hopping is applied to a PUSCH. The frequency-hopping flag field may be at least used to indicate whether frequency-hopping is applied to a PUSCH scheduled by the DCI format 0_0.

The MCS field included in the DCI format 0_0 may be at least used to indicate a modulation scheme for a PUSCH and/or a part of or all a target coding rate for the PUSCH. The MCS field included in the DCI format 0_0 may be at least used to indicate a modulation scheme for a PUSCH scheduled by the DCI format 0_0 and/or a part of or all a target coding rate for the PUSCH. A size of a transport block (TBS: Transport Block Size) of a PUSCH may be given based at least on a target coding rate and a part of or all a modulation scheme for the PUSCH.

The DCI format 0_0 may not include fields used for a CSI request. That is, CSI may not be requested by the DCI format 0_0.

The DCI format 0_0 may not include a carrier indicator field. An uplink component carrier on which a PUSCH scheduled by the DCI format 0_0 is arranged may be the same as an uplink component carrier on which a PDCCH including the DCI format 0_0 is arranged.

The DCI format 0_0 may not include a BWP field. An uplink BWP on which a PUSCH scheduled by the DCI format 0_0 is arranged may be the same as an uplink BWP on which a PDCCH including the DCI format 00 is arranged.

The DCI format 0_1 is at least used for scheduling of a PUSCH for a cell (or arranged on a cell). The DCI format 0_1 includes at least a part of or all fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 01 may indicate 0 (or may indicate that the DCI format 0_1 is an uplink DCI format).

The frequency domain resource assignment field included in the DCI format 0_1 may be at least used to indicate the assignment of frequency resources for a PUSCH. The frequency domain resource assignment field included in the DCI format 0_1 may be at least used to indicate the assignment of frequency resources for a PUSCH scheduled by the DCI format.

The time domain resource assignment field included in the DCI format 0_1 may be at least used to indicate the assignment of time resources for a PUSCH. The time domain resource assignment field included in DCI format 0_1 may be at least used to indicate the assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 0_1 may be at least used to indicate a modulation scheme for a PUSCH and/or a part of or all a target coding rate for the PUSCH. The MCS field included in the DCI format 0_1 may be at least used to indicate a modulation scheme for a PUSCH scheduled by the DCI format and/or part or all of a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, an uplink BWP on which a PUSCH is arranged may be the active uplink BWP. When a number of uplink BWPs configured in the terminal device 1 in an uplink component carrier is two or more, a number of bits for the BWP field included in the DCI format 0_1 used for scheduling a PUSCH arranged on the uplink component carrier may be one or more. When a number of uplink BWPs configured in the terminal device 1 in an uplink component carrier is one, a number of bits for the BWP field included in the DCI format 0_1 used for scheduling a PUSCH arranged on the uplink component carrier may be zero.

The DCI format 0_0 may include a ChannelAccess-CPext field. The ChannelAccess-CPext field may indicate channel access type and/or CP extension. For example, the ChannelAccess-CPext field may indicate combinations of channel access type and CP extension. The ChannelAccess-CPext field may be 0 bit, 2 bits, or more than 2 bits.

The CSI request field is at least used to indicate CSI reporting.

If the DCI format 0_1 includes the carrier indicator field, the carrier indicator field may be used to indicate an uplink component carrier (or a serving cell) on which a PUSCH is arranged. When the DCI format 0_1 does not include the carrier indicator field, a serving cell on which a PUSCH is arranged may be the same as the serving cell on which a PDCCH including the DCI format 0_1 used for scheduling of the PUSCH is arranged. When a number of uplink component carriers (or a number of serving cells) configured in the terminal device 1 in a serving cell group is two or more (when uplink carrier aggregation is operated in a serving cell group), or when cross-carrier scheduling is configured for the serving cell group, a number of bits for the carrier indicator field included in the DCI format 0_1 used for scheduling a PUSCH arranged on the serving cell group may be one or more (e.g., 3). When a number of uplink component carriers (or a number of serving cells) configured in the terminal device 1 in a serving cell group is one (or when uplink carrier aggregation is not operated in a serving cell group), or when the cross-carrier scheduling is not configured for the serving cell group, a number of bits for the carrier indicator field included in the DCI format 0_1 used for scheduling of a PUSCH arranged on the serving cell group may be zero.

The DCI format 1_0 is at least used for scheduling of a PDSCH for a cell (arranged on a cell). The DCI format 1_0 includes at least a part of or all fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 10 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 1_0 may be at least used to indicate the assignment of time resources for a PDSCH scheduled by the DCI format 1_0.

The MCS field included in the DCI format 1_0 may be at least used to indicate a modulation scheme for a PDSCH and/or a part of or all a target coding rate for the PDSCH. The MCS field included in the DCI format 1_0 may be at least used to indicate a modulation scheme for a PDSCH scheduled by the DCI format 1_0 and/or a part of or all a target coding rate for the PDSCH. A size of a transport block (TBS: Transport Block Size) of a PDSCH may be given based at least on a target coding rate and a part of or all a modulation scheme for the PDSCH.

The PDSCH-to-HARQ-feedback timing indicator field may be at least used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The PUCCH resource indicator field may be a field indicating an index of any one or more PUCCH resources included in the PUCCH resource set for a PUCCH transmission. The PUCCH resource set may include one or more PUCCH resources. The PUCCH resource indicator field may trigger PUCCH transmission with a PUCCH resource indicated at least based on the PUCCH resource indicator field.

The DCI format 1_0 may not include the carrier indicator field. A downlink component carrier on which a PDSCH scheduled by the DCI format 1_0 is arranged may be the same as a downlink component carrier on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 1_0 is arranged.

The DCI format 1_1 is at least used for scheduling of a PDSCH for a cell (or arranged on a cell). The DCI format 1_1 includes at least a part of or all fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 11 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_1.

The time domain resource assignment field included in the DCI format 1_1 may be at least used to indicate the assignment of time resources for a PDSCH. The time domain resource assignment field included in the DCI format 1_1 may be at least used to indicate the assignment of time resources for a PDSCH scheduled by the DCI format 1_1.

The MCS field included in the DCI format 1_1 may be at least used to indicate a modulation scheme for a PDSCH and/or a part of or all a target coding rate for the PDSCH. The MCS field included in the DCI format 1_1 may be at least used to indicate a modulation scheme for a PDSCH scheduled by the DCI format 1_1 and/or a part of or all a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, a downlink BWP on which a PDSCH is arranged may be the active downlink BWP. When a number of downlink BWPs configured in the terminal device 1 in a downlink component carrier is two or more, a number of bits for the BWP field included in the DCI format 1_1 used for scheduling a PDSCH arranged on the downlink component carrier may be one or more. When a number of downlink BWPs configured in the terminal device 1 in a downlink component carrier is one, a number of bits for the BWP field included in the DCI format 1_1 used for scheduling a PDSCH arranged on the downlink component carrier may be zero.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, a downlink component carrier (or a serving cell) on which a PDSCH is arranged may be the same as a downlink component carrier (or a serving cell) on which a PDCCH including the DCI format 1_1 used for scheduling of the PDSCH is arranged. When a number of downlink component carriers (or a number of serving cells) configured in the terminal device 1 in a serving cell group is two or more (when downlink carrier aggregation is operated in a serving cell group), or when cross-carrier scheduling is configured for the serving cell group, a number of bits for the carrier indicator field included in the DCI format 1_1 used for scheduling a PDSCH arranged on the serving cell group may be one or more (e.g., 3). When a number of downlink component carriers (or a number of serving cells) configured in the terminal device 1 in a serving cell group is one (or when downlink carrier aggregation is not operated in a serving cell group), or when the cross-carrier scheduling is not configured for the serving cell group, a number of bits for the carrier indicator field included in the DCI format 1_1 used for scheduling of a PDSCH arranged on the serving cell group may be zero.

A PDSCH may be used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink physical signals may correspond to a set of resource elements. The downlink physical signals may not carry the information generated in the higher-layer. The downlink physical signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part of or all an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal may be used at least for the terminal device 1 to synchronize in the frequency domain and/or time domain for downlink. The synchronization signal is a generic name of PSS (Primary Synchronization Signal) and SSS (Secondary Synchronization Signal).

Figure 7:
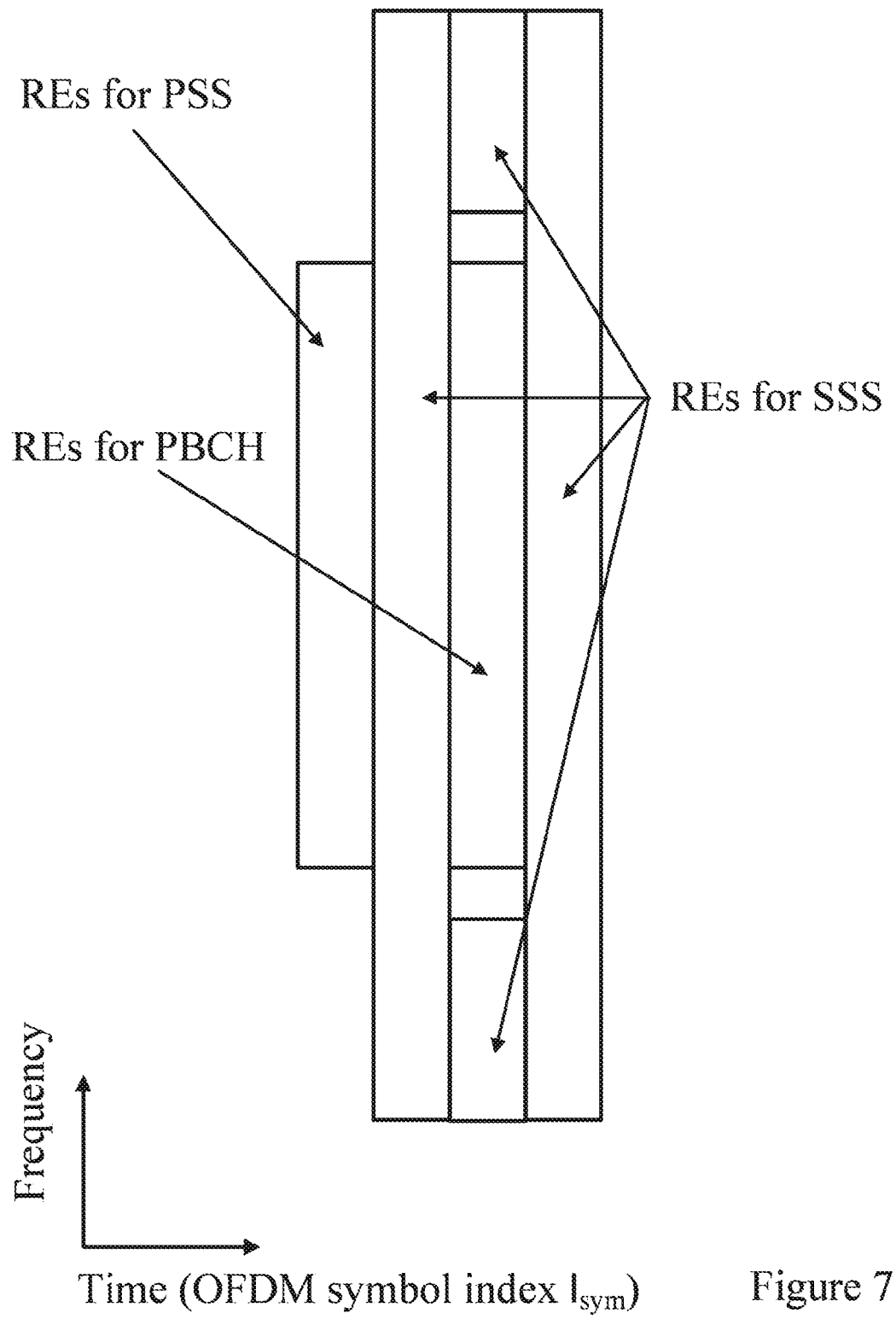
FIG. 7 is a diagram showing a configuration example of an SS/PBCH block according to an aspect of the present embodiment.

FIG. 7 is a diagram showing a configuration example of an SS/PBCH block according to an aspect of the present embodiment. In FIG. 7, the horizontal axis indicates time domain (OFDM symbol index $1_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 7, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block may be identical.

A PBCH may be estimated from a DMRS for the PBCH. For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) may be given based on the set of antenna ports for the PDSCH. The set of antenna ports for the DMRS for the PDSCH may be the same as the set of antenna ports for the PDSCH.

Transmission of a PDSCH and transmission of a DMRS for the PDSCH may be indicated (or scheduled) by one DCI format. The PDSCH and the DMRS for the PDSCH may be collectively referred to as PDSCH. Transmitting a PDSCH may be transmitting a PDSCH and a DMRS for the PDSCH.

A PDSCH may be estimated from a DMRS for the PDSCH. For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) may be the same as an antenna port for the PDCCH.

A PDCCH may be estimated from a DMRS for the PDCCH. For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices 1. The CCCH may be used for the terminal device 1 which is not connected by RRC. The DCCH may be used at least to transmit a dedicated RRC message to the terminal device 1. The DCCH may be used for the terminal device 1 that is in RRC-connected mode.

The RRC message includes one or more RRC parameters (information elements). For example, the RRC message may include a MIB. For example, the RRC message may include system information (SIB: System Information Block, MIB). SIB is a generic name for various type of SIBs (e.g., SIB1, SIB2). For example, the RRC message may include a message which corresponds to a CCCH. For example, the RRC message may include a message which corresponds to a DCCH. RRC message is a general term for common RRC message and dedicated RRC message.

SIB1 contains information relevant when evaluating if a UE is allowed to access a cell and defines the scheduling of other system information. It also contains radio resource configuration information that is common for all UEs and barring information applied to the unified access control. The terminal device 1 may be indicated with SIB1 via a PDSCH scheduled by a PDCCH. Configuration information including CORESET configuration and search space set configuration for monitoring the PDCCH may be indicated by MIB.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, and a MAC CE.

The procedure performed by the terminal device 1 includes at least a part of or all the following 5A to 5C. The 5A is cell search. The 5B is random-access. The 5C is data communication.

FR1 may be defined as the frequency range designation corresponding to frequency range from 410 MHz to 7125 MHz. FR2 may be defined as the frequency range designation corresponding to frequency range from 24250 MHz to 71000 MHz. FR2 may cover (include, consist of) FR2-1 and FR2-2. FR2-1 may be defined as the frequency range designation corresponding to frequency range from 24250 MHz to 52600 MHz. FR2-2 may be defined as the frequency range designation corresponding to frequency range from 52600 MHz to 71000 MHz.

RNTI (Radio Network Temporary Identifier) types may at least include SI-RNTI, P-RNTI, RA-RNTI, and C-RNTI. The RA-RNTI is used for random access response. An RNTI value of 0 (0000 in hexa-decimal) may be not available (N/A) for use. An RNTI value of 65534 (FFFE in hexa-decimal) may be pre-allocated as P-RNTI. An RNTI value of 65535 (FFFF in hexa-decimal) may be pre-allocated as SI-RNTI. RNTI values from 65522 to 65533 (from FFF2 to FFFD in hexa-decimal) may be reserved.

The RA-RNTI may be given by $1+s\_id+14 \times t\_id+14 \times 80 \times f\_id+14 \times 80 \times 8 \times ul\_carrier\_id$. The s_id may be an index of the first OFDM symbol of the PRACH. t_id may be an index of the first slot of the PRACH in a system frame. For PRACH with SCS (Sub-Carrier Spacing) of 480 kHz, 960 kHz, or higher SCS, t_id may be expressed based on 120 kHz SCS. f_id may be an index of the PRACH in the frequency domain. The ul_carrier_id may be a uplink carrier used for the PRACH. A unique time-frequency domain location of the PRACH during a window (for example, a RAR window) may be determined at least based on a unique RA-RNTI value.

The cell search is a procedure used by the terminal device 1 to synchronize with a cell in the time domain and/or the frequency domain and to detect a physical cell identity. The terminal device 1 may detect the physical cell ID by performing synchronization of time domain and/or frequency domain with a cell by the cell search.

A sequence of a PSS is given based at least on a physical cell ID. A sequence of an SSS is given based at least on the physical cell ID. The terminal device 1 receives the PSS and the SSS in order to perform cell search.

An SS/PBCH block candidate indicates a resource on which an SS/PBCH block may be transmitted. That is, the SS/PBCH block may be transmitted on the resource indicated by the SS/PBCH block candidate. The base station device 3 may transmit an SS/PBCH block at an SS/PBCH block candidate. The terminal device 1 may receive (detect) the SS/PBCH block at the SS/PBCH block candidate. Terminologies of "SS/PBCH block candidate" and "candidate SS/PBCH block" can be interchangeably used.

A set of SS/PBCH block candidates in a half radio frame is also referred to as an SS-burst-set. The SS-burst-set is also referred to as a transmission window, a SS transmission window, or a DRS transmission window (Discovery Reference Signal transmission window). The SS-burst-set is a generic name that includes at least a first SS-burst-set and a second SS-burst-set.

The base station device 3 transmits SS/PBCH blocks corresponding to one or more indexes at a predetermined cycle. The terminal device 1 may detect an SS/PBCH block of at least one of the SS/PBCH blocks corresponding to the one or more indexes. The terminal device 1 may attempt to decode the PBCH included in the SS/PBCH block.

For a half frame with SS/PBCH blocks, the first symbol indexes for candidate SS/PBCH blocks are determined as in Case A to Case G. The index 0 corresponds to the first symbol of the first slot in a half frame. Case A is used for SS/PBCH blocks of 15 kHz SCS. In Case A, the first symbols of the candidate SS/PBCH blocks have indexes of $\{2, 8\}+14n$. Case B is used for SS/PBCH blocks of 30 kHz SCS. In Case B, the first symbols of the candidate SS/PBCH blocks have indexes of $\{4, 8, 16, 20\}+28n$. Case C is used for SS/PBCH blocks of 30 kHz SCS. In Case C, the first symbols of the candidate SS/PBCH blocks have indexes of $\{2, 8\}+14n$. Case D is used for SS/PBCH blocks of 120 kHz SCS. In Case D, the first symbols of the candidate SS/PBCH blocks have indexes of $\{4, 8, 16, 20\}+28n$. Case E is used for SS/PBCH blocks of 240 kHz SCS. In Case E, the first symbols of the candidate SS/PBCH blocks have indexes of $\{8, 12, 16, 20, 32, 36, 40, 44\}+56n$. Case F is used for SS/PBCH blocks of 480 kHz SCS. In Case F, the first symbols of the candidate SS/PBCH blocks have indexes of $(2, 9)+14n$. Case G is used for SS/PBCH blocks of 960 kHz SCS. In Case G, the first symbols of the candidate SS/PBCH blocks have indexes of $\{2, 9\}+14n$. A value of n may be an integer. The value range of n may be determined/provided/given by whether operation without shared spectrum channel access (licensed operation) or operation with shared spectrum channel access (unlicensed operation) and/or by the carrier frequencies are within FR1 or FR2 or FR2-1 or FR2-2.

Candidate SS/PBCH blocks in a half frame are indexed in an ascending order in time from 0 to $L^{bar}_{max}-1$. $L^{bar}_{max}$ is determined according to SS/PBCH block patterns for Cases A through G and corresponding n values. $L_{max}$ is a maximum number of SS/PBCH block indexes in a cell. For operation without shared spectrum channel access, $L_{max}=L^{bar}_{max}$. For operation with shared spectrum channel access, $L_{max}$ may be equal to or smaller than $L^{bar}_{max}$.

For $L^{bar}_{max}=4$, the terminal device 1 determines the 2 LSB (least significant bit) bits of a candidate SS/PBCH block index per half frame from a one-to-one mapping with an index of the DM-RS sequence transmitted in the PBCH. For $L^{bar}_{max}>4$, the terminal device 1 determines the 3 LSB (least significant bit) bits of a candidate SS/PBCH block index per half frame from a one-to-one mapping with an index of the DM-RS sequence transmitted in the PBCH. The 3 LSB bits are the $1^{st}$, $2^{nd}$, and $3^{rd}$ bits within the bits used for indication of a candidate SS/PBCH block index. For $L^{bar}_{max}=64$, the terminal device 1 determines 3 MSB (most significant bit) bits of the candidate SS/PBCH block index from PBCH payload $a^{bar}_{A+5}$, $a^{bar}_{A+6}$, $a^{bar}_{A+7}$. The PBCH payload bits in a transport block delivered to layer 1 are denoted by $a^{bar}_0, a^{bar}_1, \ldots, a^{bar}_{A-1}$. Here, A is the payload size generated by higher layers. Notations A and $A^{bar}$ are both used to denote the payload size generated by higher layers and may be used interchangeably. For $L^{bar}_{max}=64, 80, 128$, or other values larger than 64 and smaller than 128, $a^{bar}_{A+5}$, $a^{bar}_{A+6}$, $a^{bar}_{A+7}$ may be the $6^{th}$, $5^{th}$, and $4^{th}$ bits of the candidate SS/PBCH block index, respectively.

Terminologies "SS/PBCH block candidate" and "SS/PBCH block" may be used interchangeably.

A higher-layer parameter (information element) MIB includes at least a higher layer-parameter (field) subCarrierSpacingCommon and a higher-layer parameter (field) ssb-SubcarrierOffset. The higher-layer parameter subCarrierSpacingCommon may be described by ENUMERATED type with two entries. 1 bit of MIB payload (1 MIB payload bit) may be used for indication of subCarrierSpacingCommon. The higher-layer parameter ssb-SubcarrierOffset may be described by INTEGER type with a range of (0, 1, . . . , 15). 4 bits of MIB payload (4 MIB payload bits) may be used for indication of ssb-SubcarrierOffset. The higher-layer parameter ssb-SubcarrierOffset may correspond to $k_{SSB}$. $k_{SSB}$ is the frequency domain offset between a SS/PBCH block and the overall resource block grid in number of subcarriers.

The terminal device 1 may assume that transmission of SS/PBCH blocks in a half frame is within a discovery burst transmission window (DBTW) that starts from the first symbol of the first slot in a half-frame. The terminal device 1 may be provided per serving cell by DiscoveryBurstWindowLength a duration of the DBTW. DiscoveryBurstWindowLength may be provided by ServingCellConfigCommon or SIB1. If DiscoveryBurst-WindowLength is not provided, the terminal device 1 may assume that the duration of the discovery burst transmission window is a half frame. For a serving cell, The terminal device 1 assumes that a periodicity of the DBTW is same as a periodicity of half frames for receptions of SS/PBCH blocks in the serving cell. The terminal device 1 may determine an SS/PBCH block index according to ($N^{PBCH}_{DM-RS}$ mod $N^{QCL}_{SSB}$), or according to ($i^{bar}$ mod $N^{QCL}_{SSB}$). $i^{bar}$ is the candidate SS/PBCH block index. The terminal device 1 may assume that within a discovery burst transmission window (DBTW), a number of transmitted SS/PBCH blocks on a serving cell is not larger than $N^{QCL}_{SSB}$ and a number of transmitted SS/PBCH blocks with a same SS/PBCH block index is not larger than one.

A quantity $k_{SSB}$ may be the subcarrier offset from subcarrier 0 in common resource block (CRB) $N^{SSB}_{CRB}$ to subcarrier 0 of the SS/PBCH block. $N^{SSB}_{CRB}$ may be obtained from a higher-layer parameter offsetToPointA. The terminal device 1 may determine CRB $N^{SSB}_{CRB}$ at least based on subcarrier 0 of the SS/PBCH block and $k_{SSB}$. $k_{SSB}$ may be derived from the frequency difference between the SS/PBCH block and Point A. Point A may serve as a common reference point for resource block grids/resource grids. Point A may be obtained from offsetToPointA for a PCell downlink. Point A may be obtained from absoluteFrequencyPointA for all other cases. offsetToPointA may represent the frequency offset between point A and the lowest subcarrier of the lowest resource block, which has the subcarrier spacing provided by the higher-layer parameter subCarrierSpacingCommon and overlaps with the SS/PBCH block used by the UE (terminal device 1) for initial cell selection, expressed in units of resource blocks assuming 15 kHz subcarrier spacing for FR1 and 60 kHz or 120 kHz subcarrier spacing for FR2.

Figure 8:
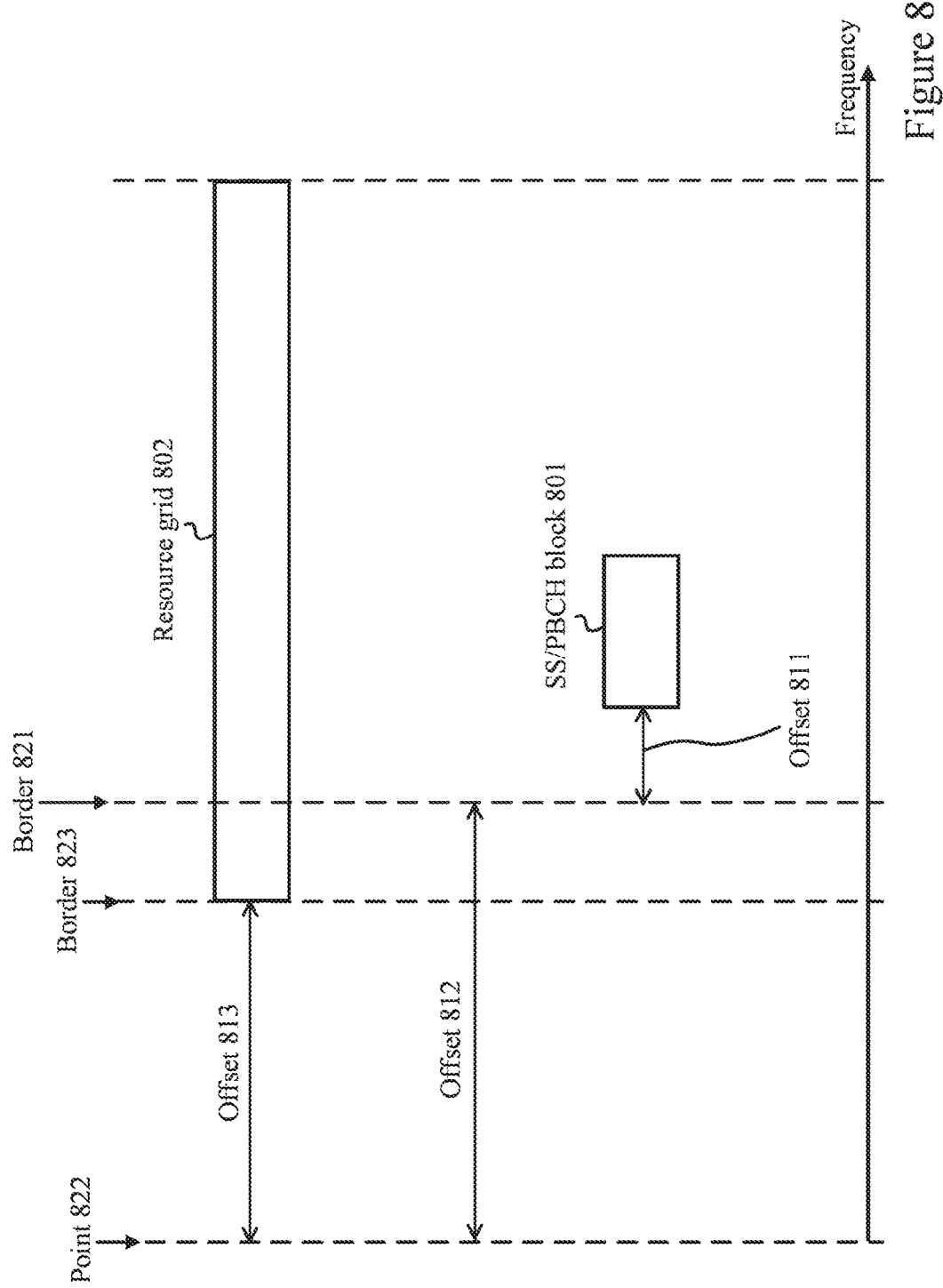
FIG. 8 is a diagram illustrating an example of point A according to an aspect of the present embodiment.

FIG. 8 is a diagram illustrating an example of point A according to an aspect of the present embodiment. The terminal device 1 detects/receives SS/PBCH block 801. The terminal device 1 may determine border 821 at least based on the SS/PBCH block 801 and offset 811. The border 821 may be a subcarrier 0 (the lowest indexed subcarrier) in $N^{SSB}_{CRB}$ CRB. The offset 811 may be provided by a quantity $k_{SSB}$. The offset 811 may the subcarrier offset from border 821 to a subcarrier 0 (the lowest indexed subcarrier) of the SS/PBCH block 801. The terminal device 1 may determine point 822 at least based on the border 821 and offset 812. The point 822 may be point A. The offset 812 may be provided by offsetToPointA. The offset may present/be the frequency offset between the point 822 and the border 821 in units of resource blocks assuming a subcarrier spacing. The assumed subcarrier spacing may be 60 kHz for FR2-1. The assumed subcarrier spacing may be 120 kHz for FR2-2. The terminal device 1 may determine border 823 at least based on the point 822 and offset 813. The border 823 may be a subcarrier 0 (the lowest indexed subcarrier) of resource grid 802. The offset 813 may be provided by a higher-layer parameter offsetToCarrier. The offset 813 may present/be the frequency offset in units of subcarriers.

A random-access may be a procedure including multiple messages. A Type-1 random-access may be a procedure including at least a part of or all message 1, message 2, message 3, and message 4. A Type-2 random-access may be a procedure including at least a part of or all message A and message B.

A message 1 is a procedure in which the terminal device 1 transmits a PRACH. The terminal device 1 transmits the PRACH in one PRACH occasion selected among one or more PRACH occasions based on at least the index of the SS/PBCH block candidate detected based on the cell search. The terminal device 1 may transmit or attempt to transmit a PRACH at least based on configurations provided by a higher-layer parameter. The configurations provided by the higher-layer parameter may at least include a set of PRACH occasions (the number of time-domain PRACH occasions) and a PRACH slot for transmission of the PRACH. In a case that a PRACH occasion in the set of PRACH occasions is allocated to a slot different from the PRACH slot, the PRACH occasion may be dropped for transmission of the PRACH. That is, in a case that the set of PRACH occasions spans multiple slots when allocating symbols (for example, a subset of the set of PRACH occasions are allocated with symbols not in the PRACH slot), a subset of the set of PRACH occasions may be dropped for transmission of the PRACH.

In a case that the terminal device 1 detects the DCI format with CRC scrambled by the corresponding RA-RNTI and LSBs of a SFN field in the DCI format are the same as corresponding LSBs of the SFN where the terminal device 1 transmitted the PRACH, and the terminal device 1 receives a transport block in a corresponding PDSCH within the window, the terminal device 1 may pass the transport block to higher-layers. The higher-layers may parse the transport block for a random access preamble identity (RAPID) associated with the PRACH transmission. In a case that the higher-layers identify the RAPID in RAR message(s) of the transport block, the higher-layers may indicate an uplink grant to the physical layer. The terminal device 1 may consider (assume, determine) that the RAR or the RAR message(s) or the PDSCH or the transport block or the RA-RNTI is valid.

A PRACH configuration index may be configured by a higher-layer parameter. The PRACH configuration index may correspond to a row in a table that is used for random access configurations. Based on the PRACH configuration index and the table, the terminal device 1 may determine a preamble format, a PRACH configuration period, a slot number expressed in 60 kHz SCS, a staring symbol index ($l_0$), a number of PRACH slots within a 60 kHz slot, a number of time-domain PRACH occasions within a PRACH slot ($N_t^{RA,slot}$), and a PRACH duration ($N_{dur}^{RA}$). A PRACH slot may be defined as a slot that is configured for PRACH transmissions (PRACH occasions) and is expressed in PRACH subcarrier spacing. PRACH slot may be defined as a slot that is configured for PRACH transmissions. The PRACH may be used to convey a random-access preamble. The sequence $x_{u,v}(n)$ of the PRACH is defined by $x_{n,v}(n) = x_u \pmod{(n+C_v, L_{RA})}$, where $x_u$ is a ZC sequence (Zadoff-Chu sequence) and defined by $x_u = \exp(-j\pi u i(i+1)/L_{RA})$. Here, j is an imaginary unit, p is the circle ratio, $C_v$ corresponds to cyclic shift of the PRACH, $L_{RA}$ corresponds to the length of the PRACH, i is an integer in the range of 0 to $L_{RA}-1$ and u is a sequence index for the PRACH. For a given PRACH occasion (PRACH opportunity), 64 random-access preambles may be defined. At least based on the PRACH occasion configuration, at least part or all of time domain resources and frequency domain resources are provided for a PRACH occasion.

PRACH occasion configuration (random access configuration) may include at least part or all of a PRACH configuration period (PCF) $T_{PCF}$, a number of PRACH occasions $N^{PCFR}_{RO,t}$ included in the time domain of a PRACH configuration period, a number of PRACH occasions included in the frequency domain $N_{RO,f}$, a number $N^{RO}_{preamble}$ of random-access preambles per PRACH occasion allocated for random-access, a number of preambles allocated per index of SS/PBCH block candidate for contention based random-access (CBRA), $N^{SSB}_{preamble, CBRA}$, and a number of PRACH occasions $N^{SSB}_{RO}$ allocated per index of SS/PBCH block candidate for contention based random-access.

An association between an index of an SS/PBCH block candidate that corresponds to an SS/PBCH block detected by the terminal device 1 and a PRACH occasion may be provided at least based on first bitmap information (ssb-PositionInBurst) indicating one or more indexes of SS/PBCH block candidates used for transmission of actually-transmitted SS/PBCH blocks. The terminal device 1 may determine an association between the index of SS/PBCH block candidate including an SS/PBCH block detected by the terminal device 1 and PRACH occasions. For example, the first element of the first bitmap information may correspond to an SS/PBCH block candidate with index 0. For example, the second element of the first bitmap information may correspond to an SS/PBCH block candidate with index 1. For example, the $L_{SSB}$-1$^{th}$ element of the first bitmap information may correspond to an SS/PBCH block candidate with index $L_{SSB}$-1. The $L_{SSB}$ is number of SS/PBCH block candidates included in an SS-burst-set. For example, the first bitmap information (ssb-PositionInBurst) indicating the indexes of SS/PBCH block candidates used for transmission of SS/PBCH blocks is {1, 1, 0, 1, 0, 1, 1, 1}. The indexes of the SS/PBCH block candidates used for transmission of the SS/PBCH blocks is also called as actually transmitted SS/PBCH block or actually-transmitted SS/PBCH block candidate.

Figure 9:
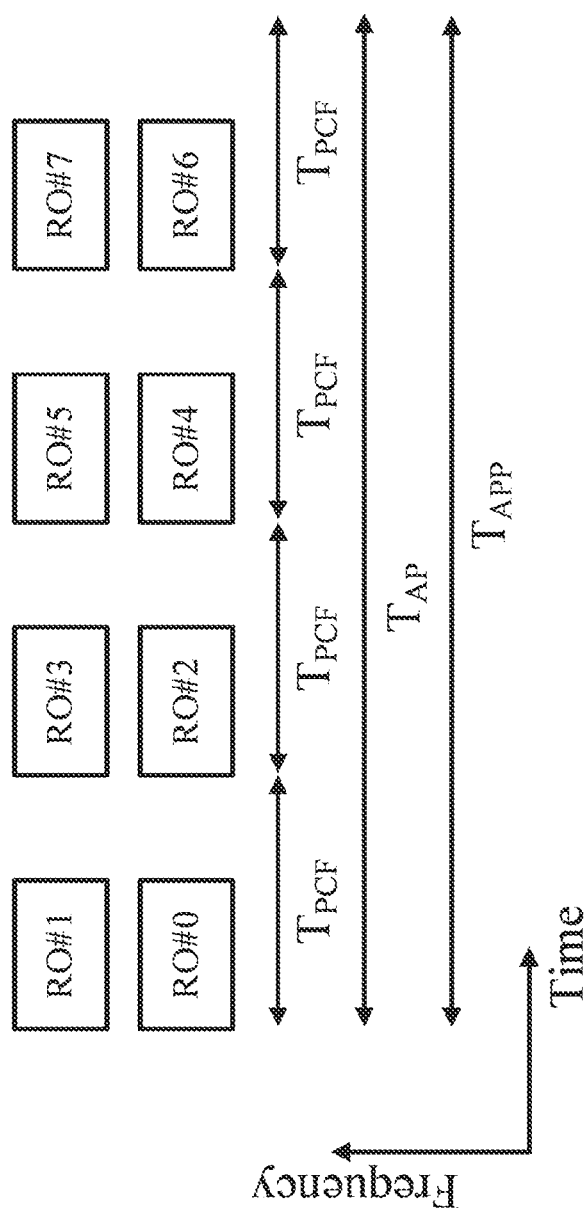
FIG. 9 is a diagram illustrating an example of a PRACH occasion configuration according to an aspect of the present embodiment.

FIG. 9 is a diagram illustrating an example of a PRACH occasion configuration according to an aspect of the present embodiment. A PRACH configuration period $T_{PCF}$ is 10 ms, a number of PRACH occasions included in the time domain of a PRACH configuration period $N^{PCF}_{RO,t}$ is 1, and a number of PRACH occasions included in the frequency domain $N_{RO,f}$ is 2. $N_{RO,f}$ may be provided by the higher-layer parameter msg1-FDM or msgA-RO-FDM. $N^{PCF}_{RO,t}$ may be determined at least based on the configured PRACH configuration index. $T_{PCF}$ may be provided by x in the expression "$n_{SFN}$ mod x=y" in the row corresponding to the configured PRACH configuration index. A case where $N^{RO}_{preamble}=64$, $N^{SSB}_{preamble,CBRA}=64$, $N^{SSB}_{RO}=1$, and the first bitmap is set to {1,1,0,1,0,1,0,0} is assumed. The SS/PBCH block candidate with index 0 may correspond to the PRACH occasion (RO #0) with index 0 and the PRACH occasion (RO #4) with index 4, the SS/PBCH block candidate with index 1 may correspond to the PRACH occasion (RO #1) with index 1 and the PRACH occasion (RO #5) with index 5, the SS/PBCH block candidate with index 3 may correspond to the PRACH occasion (RO #2) with index 2 and the PRACH occasion (RO #6) with index 6, the SS/PBCH block candidate with index 5 may correspond to the PRACH occasion (RO #3) with index 3 and the PRACH occasion (RO #7) with index 7. A first PRACH association period (PRACH AP) $T_{AP}$ is 20 ms including PRACH occasions from index 0 to index 3 and a second PRACH association period (PRACH AP) $T_{AP}$ is 20 ms including PRACH occasions from index 4 to index 7. A PRACH association pattern period (PRACH APP) $T_{APP}$ is 40 ms. The PRACH association pattern period includes two PRACH association periods.

The smallest index of "the SS/PBCH block candidates actually used for transmission of SS/PBCH blocks" indicated by the first bitmap information may correspond to the first PRACH occasion (the PRACH occasion with index 0). The n-th index of "the SS/PBCH block candidates actually used for transmission of SS/PBCH blocks" indicated by the first bitmap information may correspond to the n-th PRACH occasion (the PRACH occasion with index n−1).

The index of the PRACH occasion is set to the PRACH occasions included in the PRACH association pattern period with priority given to the frequency axis (frequency-first time-second). That is, the PRACH occasion mapping may be performed in frequency domain first and then in time domain. When the maximum integer k satisfying $T_{APP} > k*T_{AP}$ is 2 or more, one PRACH association pattern period is configured to include k PRACH association periods.

An association period, starting from frame 0, for mapping SS/PBCH block indexes to PRACH occasions is the smallest value in the set determined by the PRACH configuration period such that $N_{Tx}^{SSB}$ SS/PBCH block indexes are mapped at least once to the PRACH occasions within the association period, where a UE obtains $N_{Tx}^{SSB}$ from the value of ssb-PositionsInBurst. Here, the set may be {1, 2, 4, 8, 16} if the PRACH configuration period is 10 ms. The set may be {1, 2, 4, 8} if the PRACH configuration period is 20 ms. The set may be {1, 2, 4} if the PRACH configuration period is 40 ms. The set may be {1, 2} if the PRACH configuration period is 80 ms. The set may be {1} if the PRACH configuration period is 160 ms. If after an integer number of SS/PBCH block indexes to PRACH occasions mapping cycles within the association period there is a set of PRACH occasions or PRACH preambles that are not mapped to $N_{Tx}^{SSB}$ SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 ms. PRACH occasions not associated with SS/PBCH block indexes after an integer number of association periods, if any, are not used for PRACH transmissions.

For a PRACH transmission triggered upon request by higher-layers, a value of ra-OccassionList, if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

The terminal device 1 may transmit a PRACH with a random-access preamble in a PRACH occasion selected from PRACH occasions which corresponds to the index of the detected SS/PBCH block candidate. The base station device 3 may receive the PRACH in the selected PRACH occasion.

The message 2 is a procedure in which the terminal device 1 attempts to detect a DCI format 1_0 with CRC (Cyclic Redundancy Check) scrambled by an RA-RNTI (Random Access-Radio Network Temporary Identifier). In response to the PRACH detection, the base station device 3 may transmit a DCI format with CRC scrambled by a RA-RNTI during a RAR window. In response to the PRACH transmission, the terminal device 1 may attempt to detect (receive) the DCI format during the RAR window. The DCI format may be a DCI format 1_0. The RAR window may start at the first symbol of the earliest CORESET the terminal device 1 is configured to receive PDCCH for Type1-PDCCH CSS set that is at least one symbol after the last symbol of the PRACH occasion corresponding to the PRACH transmission. The length of the RAR window in number of slots, based on the SCS for Type1-PDCCH CSS set, may be provided by a higher-layer parameter, for example, ra-ResponseWindow.

The message 3 is a procedure for transmitting a PUSCH scheduled by a random-access response grant included in the DCI format 1_0 detected in the message 2 procedure. The random-access response grant is indicated by the MAC CE included in the PDSCH scheduled by the DCI format 1_0. The PUSCH scheduled based on the random-access response grant is either a message 3 PUSCH or a PUSCH. The message 3 PUSCH contains a contention resolution identifier MAC CE. The contention resolution ID MAC CE includes a contention resolution ID. Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution ID.

An uplink physical signal may correspond to a set of resource elements. The uplink physical signal may not carry information generated in the higher-layer. The uplink physical signal may be a physical signal used in the uplink component carrier. The terminal device 1 may transmit an uplink physical signal. The base station device 3 may receive the uplink physical signal. In the radio communication system according to one aspect of the present embodiment, at least a part of or all UL DMRS (UpLink Demodulation Reference Signal), SRS (Sounding Reference Signal), UL PTRS (UpLink Phase Tracking Reference Signal) may be used.

Data communication is a generic term for downlink communication and uplink communication.

In data communication, the terminal device 1 attempts to detect a PDCCH (attempts to monitor a PDCCH, monitors a PDCCH). in a resource identified at least based on one or all of a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set". Monitoring a PDCCH may be equivalent as monitoring a DCI format in the PDCCH.

The control resource set is a set of resources configured by a number of resource blocks and a predetermined number of OFDM symbols in a slot. The set of resources for the control resource set may be indicated by higher-layer parameters. The number of OFDM symbols included in the control resource set may be indicated by higher-layer parameters. A PDCCH may be also called as a PDCCH candidate. A search-space-set is defined as a set of PDCCH candidates. A search-space-set may be a Common Search Space (CSS) set or a UE-specific Search Space (USS) set. The CSS set is a generic name of a type-0 PDCCH common search-space-set, a type-0a PDCCH common search-space-set, a type-1 PDCCH common search-space-set, a type-2 PDCCH common search-space-set, and a Type-3 PDCCH common search-space-set. The USS set may be also called as UE-specific PDCCH search-space-set. The type-0 PDCCH common search-space-set may be used as a common search-space-set with index 0. The type-0 PDCCH common search-space-set may be a common search-space-set with index 0. A search-space-set is associated with (included in, corresponding to) a control resource set. The index of the control resource set associated with the search-space-set may be indicated by higher-layer parameters.

For a search-space-set, a part of or all 6A to 6C may be indicated at least by higher-layer parameters, where 6A is PDCCH monitoring period, 6B is PDCCH monitoring pattern within a slot, and 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based at least on a part of or all PDCCH monitoring periodicity, PDCCH monitoring pattern within a slot, and PDCCH monitoring offset.

Figure 10:
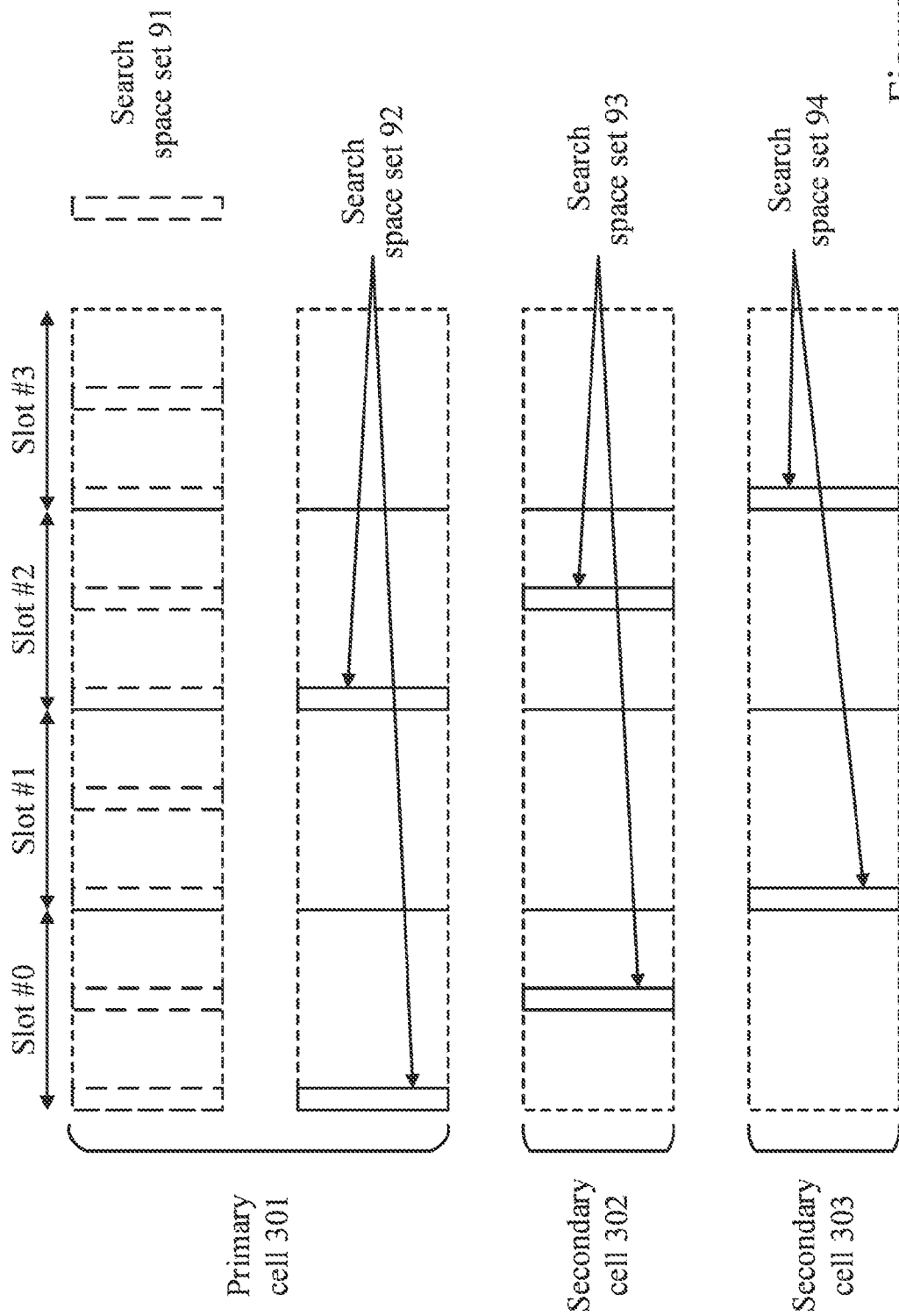
FIG. 10 is a diagram showing an example of the monitoring occasion of the search-space-set according to an aspect of the present embodiment.

FIG. 10 is a diagram showing an example of the monitoring occasion of the search-space-set according to an aspect of the present embodiment. The search-space-set 91 and the search-space-set 92 are sets in the primary cell 301, the search-space-set 93 is a set in the secondary cell 302, and the search-space-set 94 is a set in the secondary cell 303. The PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots. The PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots. The PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 0, 1, 0, 0, 0, 0, 0, 0]. That is, the monitoring occasion of the search-space-set 93 corresponds to the eighth OFDM symbol (OFDM symbol #8) in each of the even slots. The PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be at least used for a DCI format with a cyclic redundancy check (CRC) sequence scrambled by an SI-RNTI (System Information-Radio Network Temporary Identifier). The type-0a PDCCH common search-space-set may be used at least for a DCI format with a cyclic redundancy check sequence scrambled by an SI-RNTI.

The type-1 PDCCH common search-space-set may be used at least for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The Type-3 PDCCH common search-space-set may be used for a DCI format with a CRC sequence scrambled by a C-RNTI (Cell-Radio Network Temporary Identifier).

The UE-specific search-space-set may be used at least for a DCI format with a CRC sequence scrambled by a C-RNTI.

In downlink communication, the terminal device 1 may detect a downlink DCI format. The detected downlink DCI format is at least used for resource assignment for a PDSCH. The detected downlink DCI format is also referred to as downlink assignment. The terminal device 1 attempts to receive the PDSCH. Based on a PUCCH resource indicated based on the detected downlink DCI format, a HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is at least used for resource assignment for a PUSCH. The detected uplink DCI format is also referred to as uplink grant. The terminal device 1 transmits the PUSCH.

The base station device 3 and the terminal device 1 may perform a channel access procedure in the serving cell c. The base station device 3 and the terminal device 1 may perform transmission of a transmission wave in the serving cell c. For example, the serving cell c may be a serving cell configured in an unlicensed band (shared spectrum operation). The transmission wave is a physical signal transmitted from the base station device 3 to the medium or a physical signal transmitted from the terminal device 1 to the medium. The base station device 3 and the terminal device 1 may perform a channel access procedure on the carrier f of the serving cell c. The base station device 3 and the terminal device 1 may perform transmission of a transmission wave on the carrier f of the serving cell c. The carrier f is a carrier included in the serving cell c. The carrier f may be configured by a set of resource blocks given based on higher-layer parameters. The base station device 3 and the terminal device 1 may perform a channel access procedure on the carrier f of the serving cell c. The base station device 3 and the terminal device 1 may perform transmission of a transmission wave on the BWP b of the carrier f of the serving cell c. The BWP b is a subset of resource blocks included in the carrier f. The base station device 3 and the terminal device 1 may perform the channel access procedure in the BWP b of the carrier f of the serving cell c. The base station device 3 and the terminal device 1 may perform transmission of a transmission wave in the carrier f of the serving cell c. Carrying out transmission of the transmission wave on the carrier f of the serving cell c may be transmission of the transmission wave on any set of the BWPs included in the carrier f of the serving cell c. The base station device 3 and the terminal device 1 may perform the channel access procedure in the BWP b of the carrier f of the serving cell c. The base station device 3 and the terminal device 1 may transmit a transmission wave in the BWP b of the carrier f of the serving cell c.

A channel access procedure may include at least one or both of a first sensing procedure and a counting procedure. The first channel access procedure may include a first measurement. The first channel access procedure may not include the counting procedure. The second channel access procedure may at least include both the first measurement and the counting procedure. The channel access procedure is a designation including a part of or all the first channel access procedure and the second channel access procedure. After the first channel access procedure is performed, a transmission wave including at least an SS/PBCH block may be transmitted. After the first channel access procedure is performed, the gNB may transmit at least a part of or all an SS/PBCH block, a PDSCH including broadcast information, PDCCH including DCI format used for scheduling of the PDSCH, and a CSI-RS. After the second channel access procedure is performed, a transmission wave including at least a PDSCH including information which is other than the broadcast information may be transmitted. The PDSCH including the broadcast information may include at least a part of or all a PDSCH including system information, a PDSCH including paging information, and a PDSCH used for random-access.

A transmission wave including at least a part of or all an SS/PBCH block, a PDSCH including broadcast information, a PDCCH including a DCI format used for scheduling the PDSCH, and a CSI-RS is also referred to as DRS (Discovery Reference Signal). The DRS may be a set of physical signals transmitted after the first channel access procedure. If the period of the DRS is less than or equal to a predetermined length and the duty cycle of the DRS is less than or equal to a predetermined value, a transmission wave including the DRS may be transmitted after the first channel access procedure is performed. When the duration of the DRS exceeds the predetermined length, a transmission wave including the DRS may be transmitted after the second channel access procedure is performed. When the duty cycle of the DRS exceeds the predetermined value, a transmission wave including the DRS may be transmitted after the second channel access procedure is performed. For example, the predetermined length may be 1 ms. For example, the predetermined value may be 1/20.

Time and frequency resources that can be used by the terminal device 1 to report CSI are controlled by the base station device 3. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINR. RI is calculated conditioned on the reported CRI. PMI is calculated conditioned on the reported RI and CRI. CQI is calculated conditioned on the reported PMI, RI, and CRI. LI is calculated conditioned on the reported CQI, PMI, RI, and CRI. The terminal device 1 may be configured with a higher-layer parameter reportQuantity indicating what CSI quantities is to be reported. The higher-layer parameter reportQuantity set to either 'none', 'cri-RI-PMI-CQI', 'cri-RI-i1', 'cri-RI-i1-CQI', 'cri-RI-CQI', 'cri-RSRP', 'cri-SINR', 'ssb-Index-RSRP', 'ssb-Index-SINR', or 'cri-RI-LI-PMI-CQI'. The terminal device 1 may report the configured CSI quantities indicated by reportQuantity via a PUCCH or a PUSCH.

A Reporting Setting is configured by a higher-layer parameter CSI-ReportConfig and associated with a single downlink BWP. The Reporting Setting configures at least codebook configuration, time-domain behavior, frequency granularity for CQI and PMI, and CSI-related quantities to be reported by the terminal device 1. The time domain behavior is indicated by a higher-layer parameter reportConfigType and may be set to 'aperiodic','semiPersistentOnPUCCH', 'semiPersistentOnPUSCH', or 'periodic'. A higher-layer parameter CodebookConfig included in the higher-layer parameter CSI-ReportConfig may contain configuration parameters for Type-I, Type-II, Enhanced Type II CSI, or a machine learning-based type CSI.

The terminal device 1 may be configured via higher-layer signaling with one out of two possible subband sizes, where a subband is defined as $N^{SB}_{PRB}$ contiguous PRBs and depends on the total number of PRBs in the BWP. A higher-layer parameter reportFreqConfiguration contained in the CSI-ReportConfig indicates the frequency granularity of the CSI report. A higher-layer parameter csi-ReportingBand in the reportFreqConfiguration indicates a contiguous or non-contiguous subset of subbands in the BWP for which CSI shall be reported. A higher-layer parameter cqi-FormatIndicator in the reportFreqConfiguration indicates wideband CQI or subband CQI reporting. A higher-layer parameter pmi-ReportingBand in the reportFreqConfiguration indicates wideband PMI or subband PMI reporting.

A CSI Resource Setting is configured by a higher-layer parameter CSI-ResourceConfig that contains a configuration of a list of S CSI Resource Sets, where S is an integer equal to or larger than 1. The list may be comprised of references to either or both of NZP RS resource set(s) and SS/PBCH block set(s). The list may be comprised of references to CSI-IM resource set(s). The time domain behavior of the CSI-RS resources within a CSI Resource Setting are indicated by a higher-layer parameter resourceType and may be set to aperiodic, periodic, or semi-persistent.

A CQI index corresponds to specified combination of modulation, code rate, and efficiency. The terminal device 1 may quantize channel estimations into CQI indices and report the CQI indices.

For Type-I (Type I, Type 1, Type-1) codebook, the terminal device 1 may construct/generate/obtain PMI at least based on predefined codebooks. For 2 antenna ports, a PMI value corresponds to a codebook index given in a table including predefined codebooks. A codebook for PMI construction may be a precoder matrix. For 4, 8, 12, 16, 24, 32, or a larger number of antenna ports, a PMI value corresponds to three codebook indices $i_{1,1}$, $i_{1,2}$, $i_2$ when the number of layers is not equal to 2, 3, or 4 where $i=[i_{1,1}\ i_{1,2}]$, or four codebook indices $i_{1,1}$, $i_{1,2}$, $i_{1,3}$, $i_2$ when the number of layers is equal to 2, 3, or 4 where $i_1=[i_{1,1}\ i_{1,2}\ i_{1,3}]$. The terminal device 1 may report quantities of $i_1$ and $i_2$ as the PMI.

For Type-II (Type II, Type 2, Type-2) codebook, the terminal device 1 may construct/generate/obtain PMI at least based on predefined equations. For 4, 8, 12, 16, 24, 32, or a larger number of antenna ports, a PMI value corresponds to three codebook indices $i_1$ and $i_2$ when the number of layers nu is no larger than 2. When nu=1, $i_1=[i_{1,1}\ i_{1,2}\ i_{1,3,1}\ i_{1,4,1}]$. When nu=2, $i_1=[i_{1,1}\ i_{1,2}\ i_{1,3,1}\ i_{1,4,1}\ i_{1,3,2}\ i_{1,4,2}]$. When nu=1 and subbandAmplitude='false', $i_2=[i_{2,1,1}]$. When nu=2 and subbandAmplitude='false', $i_2=[i_{2,1,1}\ i_{2,1,2}]$. When nu=1 and subbandAmplitude='true', $i_2=[i_{2,1,1}\ i_{2,2,1}]$. When nu=2 and subbandAmplitude='true', $i_2=[i_{2,1,1}\ i_{2,2,1}\ i_{2,1,2}\ i_{2,2,2}]$. The terminal device 1 may report quantities of $i_1$ and $i_2$ as the PMI.

The terminal device 1 may create a beam space consisting of $N_1O_1N_2O_2$ beams by performing DFT oversampling over measurements of reference signals (channel estimation). The beam space may be full dimensional, with beams corresponding to both horizonal and vertical directions. $N_1$ is the number of antenna ports in the first dimension (horizonal) of the antenna panel. $N_2$ is the number of antenna ports in the second dimension (vertical) of the antenna panel. $O_1$ and $O_2$ are DFT oversampling factors. Values of $O_1$ and $O_2$ may be predefined, for example, 4 or 1. For a given number of CSI-RS antenna ports, supported configurations of $(N_1, N_2)$ and $(O_1, O_2)$ are predefined. $i_1$ may be used for indicating one or more beams in the beam space. $i_2$ may be used for beam selection or linear combination of beams. $i_2$ may be used for indicating relative power allocations (for example, $P_{CSI-RS}$) and a co-phasing factor (for example, phi). The procedure of processing the channel estimation into quantities of $i_1$ and $i_2$ may be considered as a CSI quantization method.

Machine learning (ML) is the study of computer algorithms that can improve automatically through experience and by the uses of data. Hereinafter, terminologies of machine learning and artificial intelligence (AI) can be used interchangeably. During the training phase, a machine learning model is built and/or modified/updated by a machine learning algorithm based on a training data set and/or an existing machine learning model. The machine learning model may be validated by a validation data set and/or tested by a test data set. During inference phase, the machine learning model is used to make predictions or decisions without explicit computer programming. Machine learning may be supervised (with labelled training data) or unsupervised (with unlabeled data). Machine learning algorithms include at least support-vector machine (SVM) algorithms, k-Nearest Neighbor (kNN) algorithms, and artificial neural network (ANN) algorithms. An ANN model consists of an input layer, an output layer, and one or more hidden layers. An autoencoder is a type of artificial neural network used to learn efficient coding of unlabeled data with unsupervised learning. The verification data set is different from the training data set. The test data set is different from the training data set. The training data set may be generated by simulations or may be collected in real world. The verification data set may be generated by simulations or may be collected in real world. The test data set may be generated by simulations or may be collected in real world.

Figure 11:
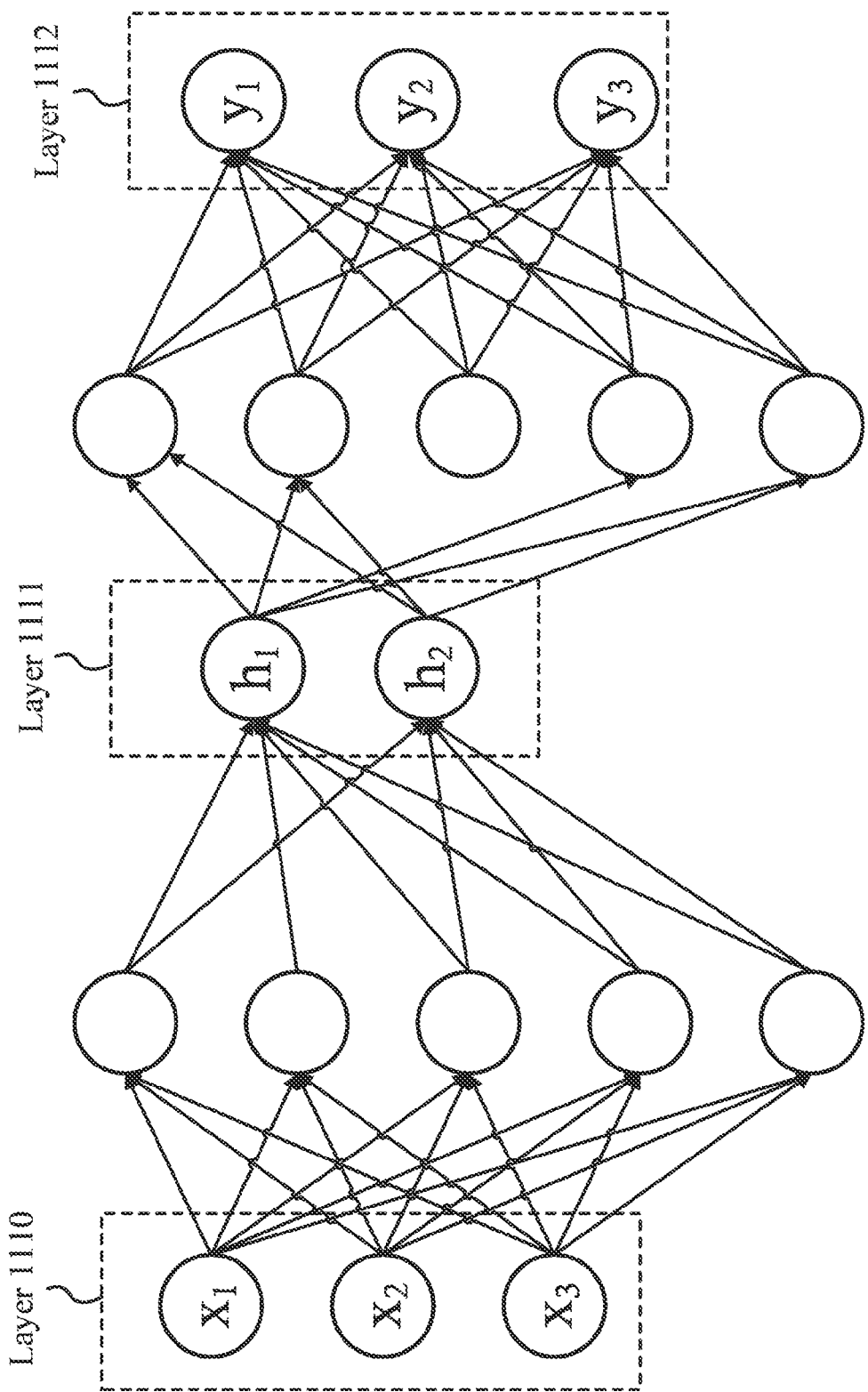
FIG. 11 is a diagram showing an example of an artificial neuron network model according to an aspect of the present embodiment.

FIG. 11 is a diagram showing an example of an artificial neuron network model according to an aspect of the present embodiment. The artificial neuron network (ANN) model consists of an input layer, an output layer, hidden layers, and connections between layers. A layer consists of artificial neurons. A connection associated with weight links two artificial neurons. For example, layer 1110 is the input layer, consisting of artificial neurons $x_1$, $x_2$, and $x_3$. For example, layer 1111 is a hidden layer, consisting of artificial neurons $h_1$ and $h_2$. For example, layer 1112 is the output layer, consisting of artificial neurons $y_1$, $y_2$, and $y_3$.

In this specification, ML (machine learning) models are considered for compressing data. For example, autoencoder models may be used for CSI data compression or decompression. The terminology "ML model" may refer to either "compression method" or "decompression method". The terminal device 1 receives a compression method used for compressing a first information and transmits a report via an uplink channel. The first information may be compressed into a compressed information by the compression method. The report may include at least the compressed information and a second information. The second information may be not compressed by the compression method.

The terminal device 1 receives a reference signal and a compression method used for compressing a first CSI related data and transmits a CSI report. The first CSI related data is at least obtained from the reference signal. The first CSI related data may be compressed into a compressed CSI data by the compression method. The CSI report may include at least the compressed CSI data and a side information. The side information may be not compressed by the compression method. The side information may be a CRC check of the first CSI related data, or a portion of the first CSI related data, or a second CSI related data. The second CSI related data may be at least obtained from the reference signal and different from the first related CSI data. The first CSI related data may be obtained based on Type-I codebook or Type-II codebook for deriving precoding matrix indicator (PMI). The first CSI related data may be obtained by a CSI quantization method not based on Type-I codebook or Type-II codebook for deriving precoding matrix indicator (PMI). The base station device 3 transmits the reference signal and the compression method for compressing the first CSI related data and receives the CSI report. The first CSI related data is at least obtained from the reference signal. The first CSI related data is compressed into the compressed CSI data by the compression method. The CSI report includes at least the compressed CSI data and the side information.

At the base station device 3, the compressed CSI data is decompressed into a decompressed CSI data by a decompression method. The side information is used to verify the decompressed CSI data. In a case that the decompressed CSI data is verified by the side information, the base station device 3 may use decompressed CSI data for precoding. In a case that the decompressed CSI data is verified by the side information, the base station device 3 may drop decompressed CSI data for precoding, and/or use the side information for precoding. The compression method and the decompression method may be two parts of a machine learning model. For example, the machine learning model may be an artificial neural network. For example, the machine learning model may be an autoencoder. The compression method is (corresponds to) the encoder of the autoencoder and the decompression method is (corresponds to) the decoder of the autoencoder. The compression method and the decompression method may be two different machine learning models. CSI compression can efficiently reduce uplink overhead. With the side information in addition to the compressed CSI data reported by the terminal device 1, the base station device 3 can verify whether the decompressed CSI data is correctly decompressed. Such verification can prevent using of incorrectly decompressed CSI data and thus improve communication efficiency.

The terminal device 1 performs channel estimation (channel measurement) based on a reference signal. The reference signal may be a CSI-RS or a SS/PBCH block. The channel estimation may be quantized into a quantized channel estimation by DFT oversampling, DFT quantization, or other quantization methods. The first CSI related data may be the quantized channel estimation. For example, the first CSI related data may be a PMI value expressed in $i_1$ and $i_2$ based on Type-I codebook or Type-II codebook. For example, the first CSI related data may be obtained at least based on the quantized channel estimation and the first CSI related is used for indicating precoding matrix. The first CSI related data may include only the PMI value. The first CSI related data may include a part of or all of PMI, CQI, RI, LI, and CRI. The bitwidth of the first CSI related data is $A_{CSI}$. The bitwidth of the compressed CSI data is $A_{compress}$ that is smaller than $A_{CSI}$. The bitwidth of the side information is $A_{side}$, where $A_{compress}+A_{side}$ may be smaller than $A_{CSI}$.

The CSI report with the machine learning-based CSI compression may be referred to as Type-III codebook, enhanced Type-II codebook, or a terminology referring to a new codebook type compared to the Type-I codebook and Type-II codebook.

Figure 12:
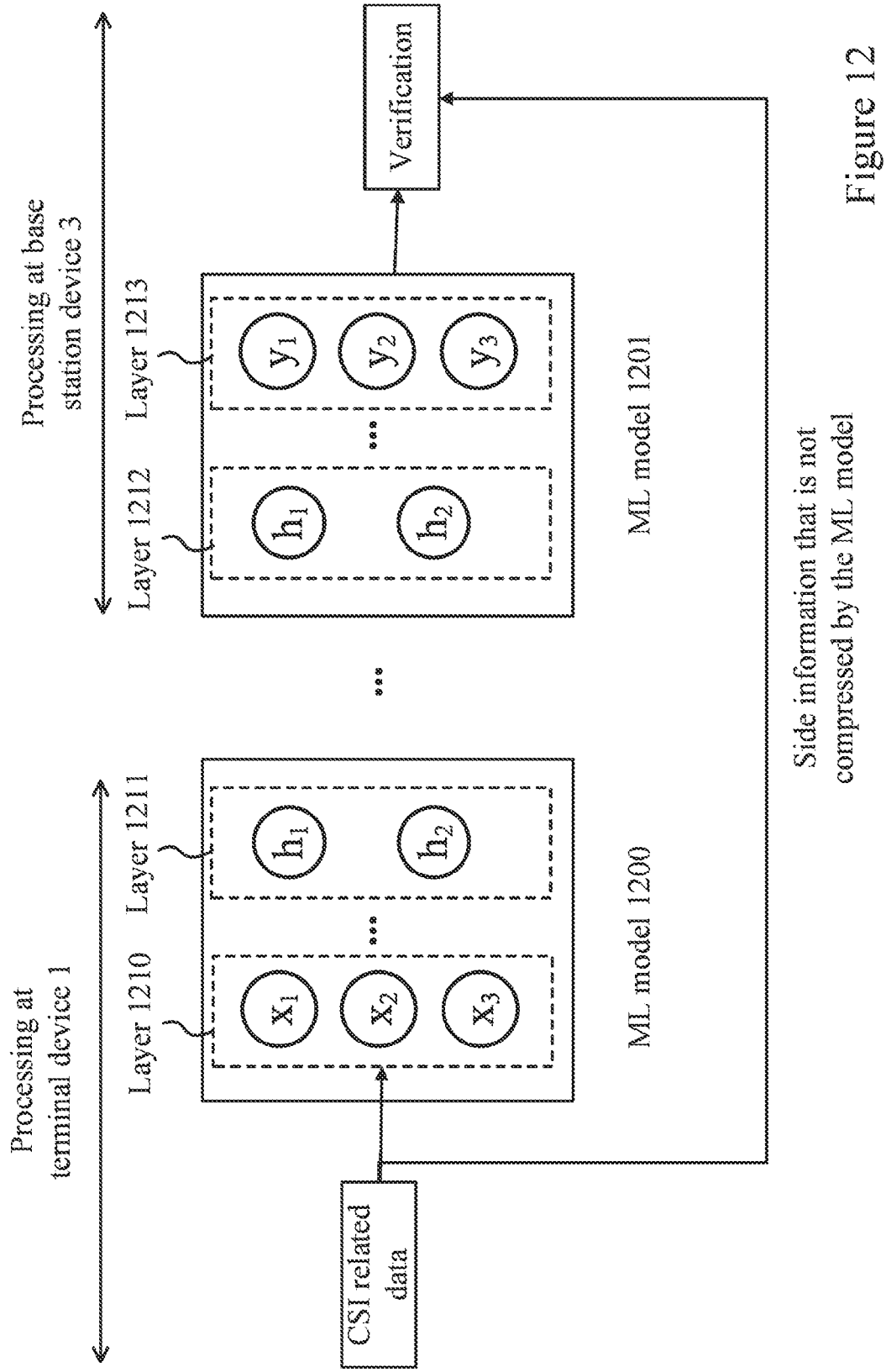
FIG. 12 is a diagram showing an example of CSI compression and decompression assisted by a side information according to an aspect of the present embodiment.

FIG. 12 is a diagram showing an example of CSI compression and decompression assisted by a side information according to an aspect of the present embodiment. A CSI related data is obtained at least based on channel estimation. The terminal device 1 may compress the CSI related data into a compressed CSI data by the ML model 1200. The CSI related data is inputted into the layer 1210 (input layer) and the compressed CSI data is outputted by the layer 1211 in the ML model 1200. The compressed CSI data and the side information that is not compressed by the ML model 1200 may be included in a CSI report. The terminal device 1 may transmit the CSI report via a PUCCH or a PUSCH. The base station device 3 may receive/detect the PUCCH or PUSCH carrying the CSI report. The based station device 3 obtains the compressed CSI data and the side information by detecting/decoding the PUCCH or the PUSCH. The base station device 3 may decompress the compressed CSI data into a decompressed CSI data by using the ML model 1201. The compressed CSI data is inputted into the layer 1212 and the decompressed CSI data is outputted by the layer 1213 (output layer) in the ML model 1201. The layer 1211 and the layer 1212 may be the same. The based station device 3 may verify the decompressed CSI data by using the side information.

For a certain purpose (for example, CSI data compression and decompression), multiple ML models may be trained and verified. Alternatively, the multiple ML models may be updated based on existing ML models. The base station device 3 may configure (transmit, indicate, deliver) the multiple ML models to the terminal device 1. The terminal device 1 may receive the multiple ML models. For example, the base station device 3 may configure a first ML model and a second ML model to the terminal device 1. The second ML model may be different from the first ML model. The terminal device 1 may receive the first ML model and the second ML model.

The base station device 3 may transmit a reference signal. The reference signal may be a CSI-RS or a SS/PBCH block. The terminal device 1 may receive the reference signal. The terminal device 1 may obtain a CSI related data at least from the reference signal. For example, the terminal device 1 may process the reference signal (for example, sampling and/or quantization) to obtain the CSI related data.

The terminal device 1 may generate multiple compressed CSI data obtained from the multiple ML models. For example, the terminal device 1 may compress the CSI related data into a first compressed CSI data by the first ML model. The terminal device 1 may compress the CSI related data into a second compressed CSI data by the second ML model. The terminal device 1 may include one or more compressed CSI data in the CSI report. The terminal device 1 may indicate which compressed CSI data is included in the CSI report. The base station device 3 may receive the CSI report.

The terminal device 1 may include one of the first compressed CSI data and the second compressed CSI data in the CSI report. The terminal device 1 may indicate that which ML model is used for CSI data compression. That is, the terminal device 1 may indicate either the first compressed CSI data or the second compressed CSI data is included in the CSI report. The base station device 3 may receive the CSI report. The base station device 3 may be indicated with that which compressed CSI data is included in the CSI report, for example, either the first compressed CSI data or the second compressed CSI data is included in the CSI report. The terminal device 1 may transmit the CSI report via an uplink transmission (for example, a PUCCH or a PUSCH). The indication may be included in the CSI report. That is, the indication may be a part of the CSI report. Alternatively, the indication may not be included in the CSI report. The indication may be transmitted via the uplink transmission apart from the CSI report. That is, the uplink transmission may include the CSI report and the indication. Alternatively, the terminal device 1 may transmit the indication corresponding to multiple CSI reports. The number of multiple CSI reports may be predetermined or configured by a higher-layer parameter. Alternatively, the terminal device 1 may transmit the indication corresponding to a period. The period may be predetermined or configured by a higher-layer parameter. The indication may be transmitted via an uplink transmission other than the uplink transmission that carries the CSI report. The base station device 3 may decompress the received compressed CSI data by using a ML model corresponding to the indication. By generating multiple compressed CSI data versions and selecting one to report, the terminal device 1 can properly choose a ML model and/or a compressed CSI data to report, according to the wireless environments, the ML processing capability, the battery status, and/or the resources for transmitting the CSI report. The efficiency of CSI reporting can be improved with less CSI report overhead and/or higher CSI report accuracy. Thus, the efficiency of the communication system can be improved.

Figure 13:
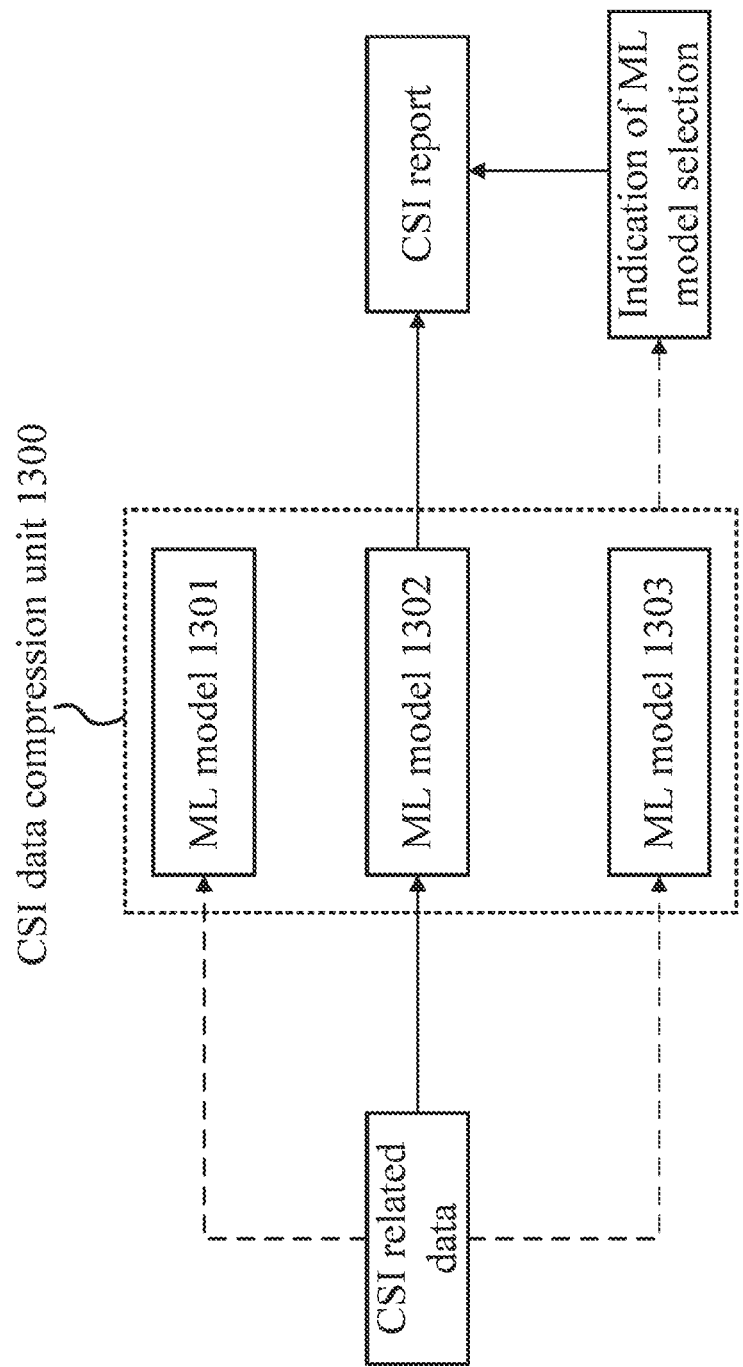
FIG. 13 is a diagram showing an example of CSI compression and decompression with multiple machine learning models according to an aspect of the present embodiment.

FIG. 13 is a diagram showing an example of CSI compression and decompression with multiple machine learning models according to an aspect of the present embodiment. In FIG. 13, the base station device 3 configures ML model 1301, ML model 1302, and ML 1303 to the terminal device 1. The terminal device 1 receives ML model 1301, ML model 1302, and ML model 1303. CSI data compression unit 1300 may include ML model 1301, ML model 1302, and ML model 1303. The terminal device 1 may obtain a CSI related data from a reference signal. The terminal device 1 may compress the CSI related data by ML model 1301, ML model 1302, and/or ML model 1303. The terminal device 1 may include a compressed CSI data by using one of the ML models (for example, ML model 1302) in the CSI report. The terminal device 1 may transmit the CSI report via an uplink transmission (for example, a PUCCH or a PUSCH). The terminal device 1 may include an indication in the CSI report. The indication is generated/provided/given by CSI data compression unit 1300. Alternatively, the terminal device 1 may transmit the indication via the uplink transmission. The indication indicates that which ML model is used for CSI data compression. The base station device 3 may receive/detect/decode the CSI report via the uplink transmission. The base station device 3 may decompress the compressed CSI data into a decompressed CSI data, using a ML model corresponding to the indication.

The terminal device 1 may include the multiple compressed CSI data in the CSI report. For example, the terminal device 1 may include the first compressed CSI data and the second compressed CSI data. The base station device 3 may receive the CSI report and obtain the first compressed CSI data and the second compressed CSI data. The base station device 3 may decompress the first compressed CSI data into a first decompressed CSI data. The base station device 3 may decompress the second compressed CSI data into a second decompressed CSI data. The base station device 3 may verify the CSI decompression by comparing the first decompressed CSI data and the second decompressed CSI data. For example, in a case that the first decompressed CSI data and the second decompressed CSI data are the same, the base station device 3 may determine that the CSI decompression is valid and may use either decompressed CSI data. In a case that the first decompressed CSI data and the second decompressed CSI data are different, the base station device 3 may determine that the CSI decompression is invalid and may not use neither of the decompressed CSI data. By including multiple compressed CSI data versions and verifying the decompressed CSI data, the reliability and/or accuracy of CSI reporting can be improved without additional CSI report overhead. Thus, the efficiency of the communication system can be improved.

Figure 14:
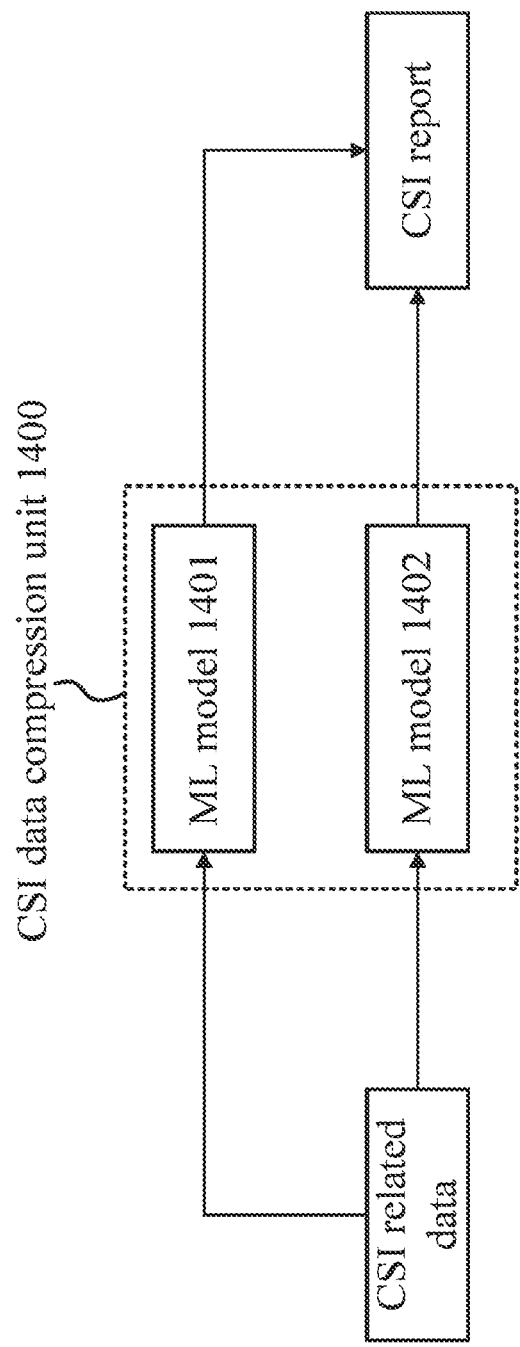
FIG. 14 is a diagram showing an example of CSI compression and decompression with multiple machine learning models according to an aspect of the present embodiment.

FIG. 14 is a diagram showing an example of CSI compression and decompression with multiple machine learning models according to an aspect of the present embodiment. In FIG. 14, the base station device 3 configures ML model 1401 and ML 1402 to the terminal device 1. The terminal device 1 receives ML model 1401 and ML model 1402. CSI data compression unit 1400 may include ML model 1401 and ML model 1402. The terminal device 1 may obtain a CSI related data from a reference signal. The terminal device 1 may compress the CSI related data into a first compressed CSI data and a second compressed CSI data, by ML model 1401 and ML model 1402, respectively. The terminal device 1 may include the first compressed CSI data and the second compressed CSI data in the CSI report. The terminal device 1 may transmit the CSI report via an uplink transmission (for example, a PUCCH or a PUSCH). The base station device 3 may receive/detect/decode the CSI report via the uplink transmission. The base station device 3 may decompress the first compressed CSI data and the second compressed CSI data into a first decompressed CSI data and a second decompressed CSI data, respectively. The base station device 3 may verify the CSI decompression by comparing the first decompressed CSI data and the second decompressed CSI data. In a case that the first decompressed CSI data and the second decompressed CSI data are the same, the base station device 3 may determine that the CSI decompression is valid and may use either decompressed CSI data. In a case that the first decompressed CSI data and the second decompressed CSI data are different, the base station device 3 may determine that the CSI decompression is invalid and may not use neither of the decompressed CSI data. That is, the base station device 3 may drop/ignore the decompressed data for further usage. Alternatively, the base station device 3 may use the decompressed CSI data with the highest compression ratio among ML model 1401 and ML model 1402, considering/assuming that the CSI decompression is still valid.

Each of a program running on the base station device 3 and the terminal device 1 according to an aspect of the present disclosure may be a program that controls a Central Processing Unit (CPU) and the like, such that the program causes a computer to operate in such a manner as to realize the functions of the above-described embodiment according to the present disclosure. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 3 according to the above-described embodiment may be achieved as an aggregation (an device group) including multiple devices. Each of the devices configuring such an device group may include some or all of the functions or the functional blocks of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (E-UTRAN) and/or NG-RAN (Next Gen RAN, NR-RAN). Furthermore, the base station device 3 according to the above-described embodiment may have some or all of the functions of a node higher than an eNodeB or the gNB.

Furthermore, some or all portions of each of the terminal device 1 and the base station device 3 according to the above-described embodiment may be typically achieved as an LSI which is an integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present disclosure is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present disclosure have been described in detail above referring to the drawings, but the specific configuration is not limited to the embodiments and includes, for example, an amendment to a design that falls within the scope that does not depart from the gist of the present disclosure. Furthermore, various modifications are possible within the scope of one aspect of the present disclosure, and embodiments that are made by suitably combining technical means disclosed according to the different embodiments are also included in the technical scope of the present disclosure. Furthermore, a configuration in which constituent elements, described in the respective embodiments and having mutually the same effects, are substituted for one another is also included in the technical scope of the present disclosure.

The invention claimed is:

1. A terminal device comprising:
reception circuitry configured to receive a reference signal and a plurality of machine learning models that is different from each other; and
transmission circuitry configured to transmit a channel state information (CSI) report, wherein:
CSI related data is obtained at least from the reference signal,
the CSI related data is compressed into a plurality of compressed CSI data by the plurality of machine learning models, respectively,
the CSI report includes one of the plurality of compressed CSI data, and
the terminal device indicates which machine learning model, among the plurality of machine learning models, is chosen for compressing the CSI related data into the one of the plurality of compressed CSI data based on wireless environments, a machine learning processing capability, a battery status, and/or resources for transmitting the CSI report.

2. A base station device comprising:
transmission circuitry configured to transmit a reference signal and a plurality of machine learning models that is different from each other; and
reception circuitry configured to receive a channel state information (CSI) report, wherein:
CSI related data is obtained at least from the reference signal,
the CSI related data is compressed into a plurality of compressed CSI data by the plurality of machine learning models, respectively,
the CSI report includes one of the plurality of compressed CSI data, and
the base station device is indicated which machine learning model, among the plurality of machine learning models, is chosen for compressing the CSI related data into the one of the plurality of compressed CSI data based on wireless environments, a machine learning processing capability, a battery status, and/or resources for transmitting the CSI report.

* * * * *